US012232229B2

(12) United States Patent
Cremer et al.

(10) Patent No.: US 12,232,229 B2
(45) Date of Patent: Feb. 18, 2025

(54) METHODS AND APPARATUS TO CONTROL LIGHT PULSING EFFECTS BASED ON MEDIA CONTENT

(71) Applicant: Gracenote Inc., Emeryville, CA (US)

(72) Inventors: Markus Kurt Cremer, Orinda, CA (US); Robert Coover, Orinda, CA (US); Zafar Rafii, Berkley, CA (US); Aneesh Vartakavi, Emeryville, CA (US); Andreas Schmidt, San Pablo, CA (US); Todd Hodges, Oakland, CA (US)

(73) Assignee: Gracenote, Inc., New York, NY (US)

( * ) Notice: Subject to any disclaimer, the term of this patent is extended or adjusted under 35 U.S.C. 154(b) by 0 days.

(21) Appl. No.: 18/663,841

(22) Filed: May 14, 2024

(65) Prior Publication Data

US 2024/0298390 A1 Sep. 5, 2024

Related U.S. Application Data

(63) Continuation of application No. 17/780,938, filed as application No. PCT/US2020/061263 on Nov. 19,
(Continued)

(51) Int. Cl.
*H05B 45/20* (2020.01)
*F21S 10/02* (2006.01)
(Continued)

(52) U.S. Cl.
CPC .............. *H05B 45/20* (2020.01); *F21S 10/02* (2013.01); *H05B 47/105* (2020.01); *F21W 2106/00* (2018.01)

(58) Field of Classification Search
CPC ........ H05B 45/20; H05B 47/105; F21S 10/02
See application file for complete search history.

(56) References Cited

U.S. PATENT DOCUMENTS

| | | | |
|---|---|---|---|
| 6,175,632 | B1 | 6/2001 | Marx |
| 7,139,617 | B1 | 11/2006 | Morgan et al. |

(Continued)

FOREIGN PATENT DOCUMENTS

| | | | | |
|---|---|---|---|---|
| GB | 2557884 | A | 7/2018 |
| KR | 20130103985 | A | 9/2013 |
| WO | 2006/011102 | A1 | 2/2006 |

OTHER PUBLICATIONS

United States Patent and Trademark Office, "Non-Final Rejection," issued in connection with U.S. Appl. No. 16/698,697 on Sep. 17, 2020, 8 pages.

(Continued)

*Primary Examiner* — Joseph L Williams
(74) *Attorney, Agent, or Firm* — McDonnell Boehnen Hulbert & Berghoff LLP

(57) ABSTRACT

Methods, apparatus, systems and articles of manufacture are disclosed to adjust device control information. The example apparatus comprises a light drive waveform generator to obtain metadata corresponding to media and generate device control information based on the metadata, the device control information to inform a lighting device to enable consecutive light pulses; an effect engine to apply an attack parameter and a decay parameter to consecutive light pulses corresponding to the device control information, the attack parameter and the decay parameter based on the metadata to affect a shape of the consecutive light pulses; and a color timeline generator to generate color information based on the metadata, the color information to inform the lighting device to change a color state.

20 Claims, 11 Drawing Sheets

Related U.S. Application Data 2020, now Pat. No. 12,035,431, which is a continuation of application No. 16/698,697, filed on Nov. 27, 2019, now Pat. No. 11,071,182.

(51) Int. Cl.
*H05B 47/105* (2020.01)
*F21W 106/00* (2018.01)

(56) References Cited

U.S. PATENT DOCUMENTS

| | | | |
|---|---|---|---|
| 8,461,443 | B2 | 6/2013 | McKinney et al. |
| 8,855,798 | B2 | 10/2014 | Dimaria et al. |
| 8,878,991 | B2 | 11/2014 | Cook |
| 8,996,538 | B1 | 3/2015 | Cremer et al. |
| 9,106,804 | B2 | 8/2015 | Roberts et al. |
| 9,213,747 | B2 | 12/2015 | Cremer et al. |
| 9,380,383 | B2 | 6/2016 | Brenner et al. |
| 9,432,612 | B2 | 8/2016 | Bruhn et al. |
| 9,510,044 | B1 | 11/2016 | Pereira et al. |
| 9,753,925 | B2 | 9/2017 | Cremer et al. |
| 9,788,777 | B1 | 10/2017 | Knight et al. |
| 9,792,084 | B2 | 10/2017 | Vartakavi et al. |
| 9,891,796 | B2 | 2/2018 | Dimaria et al. |
| 9,940,973 | B2 | 4/2018 | Roberts et al. |
| 10,146,100 | B2 | 12/2018 | Cremer et al. |
| 10,451,952 | B2 | 10/2019 | Cremer et al. |
| 11,071,182 | B2 | 7/2021 | Cremer et al. |
| 2003/0063222 | A1 | 4/2003 | Creed et al. |
| 2006/0062424 | A1 | 3/2006 | Diederiks et al. |
| 2006/0137510 | A1 | 6/2006 | Cui et al. |
| 2008/0320126 | A1 | 12/2008 | Drucker et al. |
| 2009/0002178 | A1 | 1/2009 | Guday et al. |
| 2009/0176569 | A1 | 7/2009 | Eves et al. |
| 2010/0052548 | A1 | 3/2010 | Allard et al. |
| 2010/0071535 | A1 | 3/2010 | McKinney et al. |
| 2010/0325135 | A1 | 12/2010 | Chen et al. |
| 2011/0190913 | A1 | 8/2011 | Van De Sluis et al. |
| 2011/0245941 | A1 | 10/2011 | Dewaele et al. |
| 2012/0016208 | A1 | 1/2012 | Janssen et al. |
| 2012/0129601 | A1 | 5/2012 | Gronkowski et al. |
| 2012/0210229 | A1 | 8/2012 | Bryant et al. |
| 2013/0020948 | A1 | 1/2013 | Han et al. |
| 2013/0166042 | A1 | 6/2013 | Sharma et al. |
| 2013/0207572 | A1 | 8/2013 | Tucker et al. |
| 2014/0104497 | A1 | 4/2014 | Li et al. |
| 2014/0178043 | A1 | 6/2014 | Kritt et al. |
| 2014/0330848 | A1 | 11/2014 | Chen et al. |
| 2015/0194151 | A1 | 7/2015 | Jeyachandran et al. |
| 2015/0282282 | A1 | 10/2015 | Breuer et al. |
| 2016/0127759 | A1 | 5/2016 | Jung et al. |
| 2016/0196105 | A1 | 7/2016 | Vartakavi et al. |
| 2016/0295662 | A1 | 10/2016 | Hyde et al. |
| 2016/0373197 | A1 | 12/2016 | Brenner et al. |
| 2018/0024810 | A1 | 1/2018 | Vartakavi et al. |
| 2018/0049688 | A1 | 2/2018 | Knight et al. |
| 2018/0061438 | A1 | 3/2018 | Love et al. |
| 2018/0075039 | A1 | 3/2018 | Chen et al. |
| 2018/0164655 | A1 | 6/2018 | Cremer et al. |
| 2019/0049818 | A1 | 2/2019 | Cremer et al. |
| 2019/0104593 | A1 | 4/2019 | Aliakseyeu et al. |

OTHER PUBLICATIONS

United States Patent and Trademark Office, "Notice of Allowance," issued in connection with U.S. Appl. No. 16/698,697 on Feb. 10, 2021, 9 pages.

United States Patent and Trademark Office, "Notice of Allowance," issued in connection with U.S. Appl. No. 16/698,697 on Mar. 10, 2021, 8 pages.

International Searching Authority, "International Search Report," issued in connection with International Patent Application No. PCT/US2020/061263 on Mar. 18, 2021, 3 pages.

International Searching Authority, Written Opinion, issued in connection with International Patent Application No. PCT/US2020/061263 on Mar. 18, 2021, 6 pages.

Philips, "Hue Personal Wireless Lighting," available at https://www2.meethue.com/en-us (last accessed on Jun. 28, 2018, 15 pages.

Barthet et al., "Moodplay: An Interactive Mood-Based Musical Experience," published by Queen Mary University of London, 2015, 9 pages.

United States Patent and Trademark Office, "Notice of Allowance," issued in connection with U.S. Appl. No. 16/658,833 on May 21, 2020, 7 pages.

United States Patent and Trademark Office, "Non-Final Rejection," issued in connection with U.S. Appl. No. 16/658,833 on Mar. 12, 2021, 9 pages.

United States Patent and Trademark Office, "Non-Final Rejection," issued in connection with U.S. Appl. No. 16/658,833 on Sep. 28, 2020, 8 pages.

United States Patent and Trademark Office, "Non-Final Rejection," issued in connection with U.S. Appl. No. 16/658,833 on Dec. 12, 2019, 5 pages.

United States Patent and Trademark Office, "Final Rejection," issued in connection with U.S. Appl. No. 16/658,833 on Sep. 2, 2021, 6 pages.

United States Patent and Trademark Office, "Notice of Allowance," issued in connection with U.S. Appl. No. 16/161,830 on Jun. 12, 2019, 7 pages.

United States Patent and Trademark Office, "Notice of Allowance," issued in connection with U.S. Appl. No. 15/839,447 on Jul. 16, 2018, 8 pages.

United States Patent and Trademark Office, "Notice of Allowability," issued in connection with U.S. Appl. No. 15/839,447 on Nov. 5, 2018, 5 pages.

United States Patent and Trademark Office, "Supplemental Notice of Allowability," issued in connection With U.S. Appl. No. 16/161,830 on Aug. 13, 2019, 2 pages.

United States Patent and Trademark Office, "Notice of Allowability," issued in connection with U.S. Appl. No. 16/698,697 on Jun. 24, 2021, 2 pages.

United States Patent and Trademark Office, "Notice of Allowance", issued in connection with U.S. Appl. No. 17/379,821 on Feb. 16, 2022, 8 pages.

International Searching Authority, "International Preliminary Report on Patentability", issued in connection With International Patent Application No. PCT/US2020/061263 on May 17, 2022, 7 pages.

United States Patent and Trademark Office, "Advisory Action", issued in connection with U.S. Appl. No. 16/658,833 on Feb. 7, 2022, 3 pages.

United States Patent and Trademark Office, "Notice of Allowance and Fee(s) Due", issued in connection With U.S. Appl. No. 16/658,833 on Aug. 23, 2022, 9 pages.

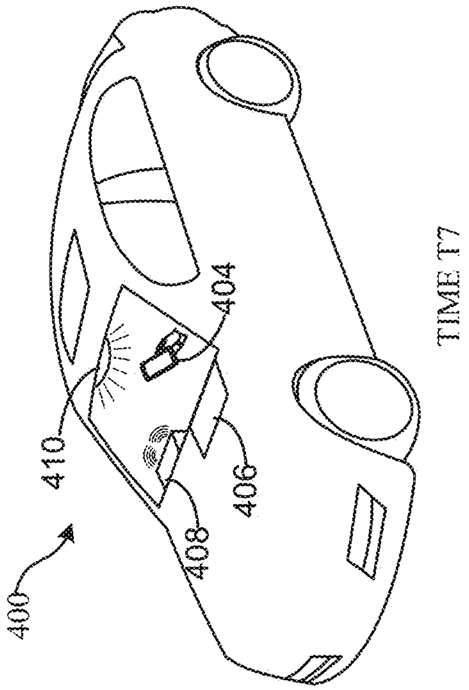
FIG. 4
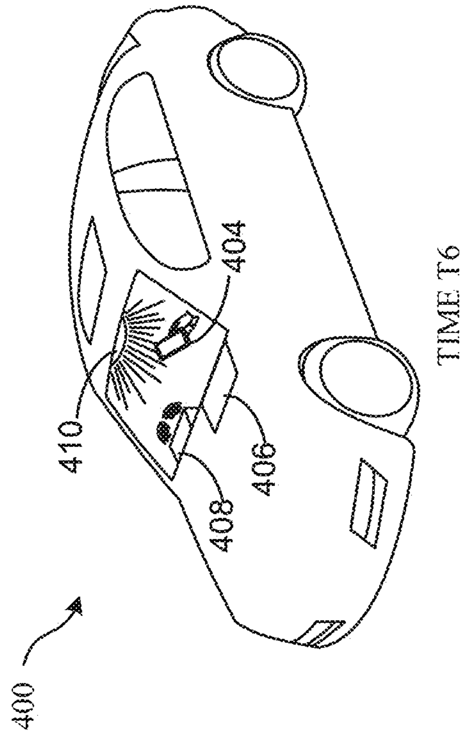

METHODS AND APPARATUS TO CONTROL LIGHT PULSING EFFECTS BASED ON MEDIA CONTENT

CROSS REFERENCE TO RELATED APPLICATIONS

The present application is a continuation of U.S. patent application Ser. No. 17/780,938, filed May 27, 2022, which is a U.S. National Phase Application pursuant to 35 U.S.C. § 371 of International Application No. PCT/US2020/061263 filed Nov. 19, 2020, which is a continuation of U.S. patent application Ser. No. 16/698,697 filed Nov. 27, 2019, now U.S. Pat. No. 11,071,182. The entire disclosure contents of these applications are herewith incorporated by reference into the present application.

FIELD OF THE DISCLOSURE

This disclosure relates generally to lighting effects, and, more particularly, to methods and apparatus to control lighting effects.

BACKGROUND

A lighting effect is the effect one or more lights have on one or more people in an area of space, such as the cabin of a vehicle, a stage, a bathroom, a church, etc. Lighting effects can be generated, designed, created, etc., based on music, photographs, video, and more. For example, lighting effects can be generated to change colors, pulse from dim to bright, etc., in synchronization with beats in music, video frame changes, etc.

BRIEF DESCRIPTION OF THE DRAWINGS

FIG. 4 illustrates an example system to generate device control information at a first time and at a second time and produce light effects at the first time and the second time based on the device control information.

Figure 1:
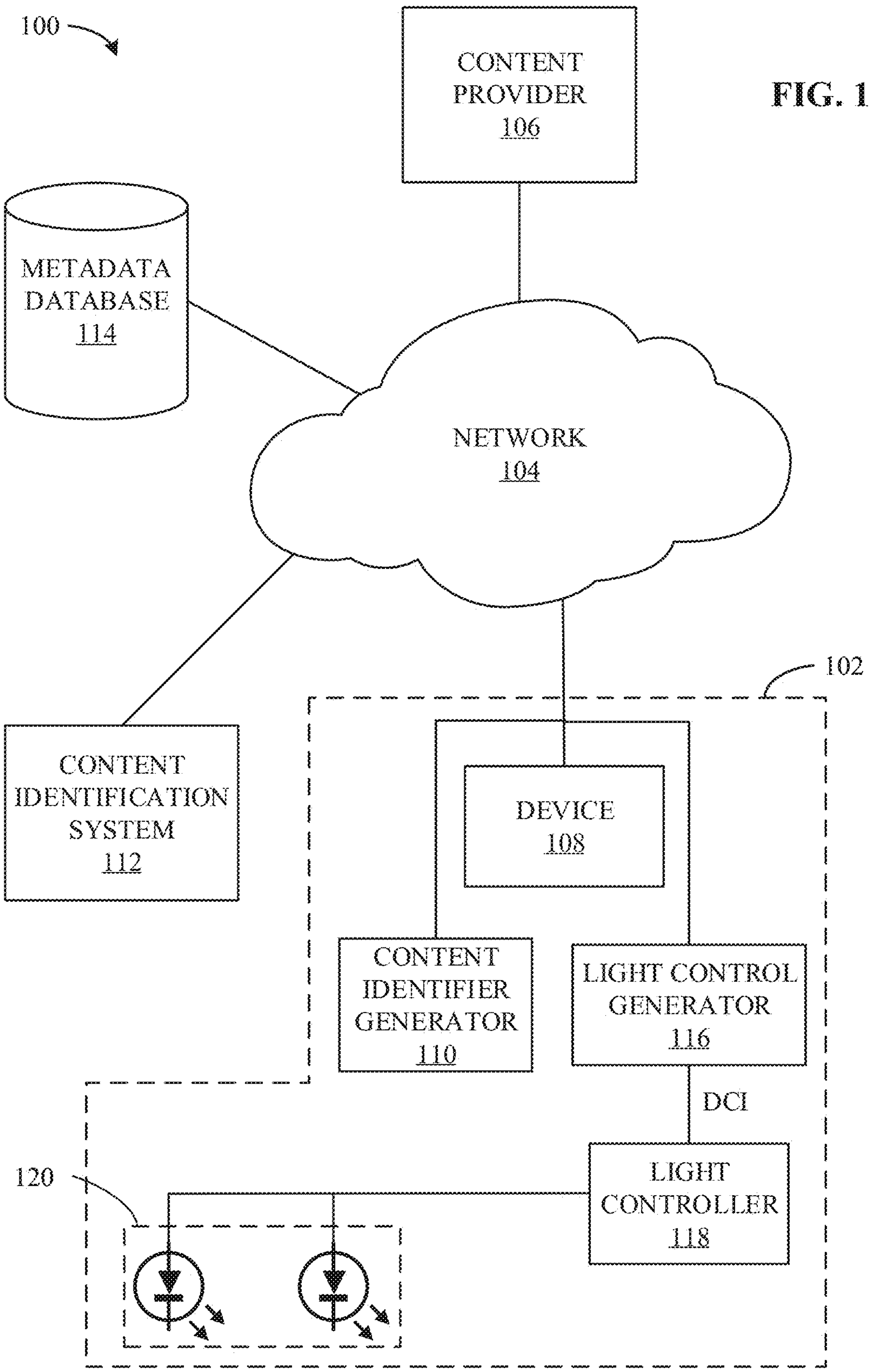
FIG. 1 is an illustration of an example network diagram to identify media content and generate device control information.

The figures are not to scale. In general, the same reference numbers will be used throughout the drawings and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Vehicles, hotel lobbies, restaurants, bars, showers stalls, and/or a plurality of other environments may utilize lights and sound to entertain a person, effect an emotion of a person, alert a person and/or effect an internal state of a person. For example, a hotel lobby may emit a dim yellow light as an addition to classical instrumental music to relax guests and make them feel welcome. In other examples, the bar may utilize disco lights and hip-hop music to encourage customers to dance.

Some environments may utilize lights and sound to implement a safety feature. For example, a hotel lobby and bar may flash bright white and/or red lights and emit a siren sound to indicate a fire or an emergency. A vehicle may flash a light and emit a beeping sound to indicate the vehicle is in reverse and a person behind the vehicle should remove themselves from the path of the vehicle.

In some examples, environments like casinos utilize, among other techniques, lights and sound to ensure gamblers are alert and awake throughout the evening in an effort to generate revenue. For example, lights specifically can affect the circadian rhythm of a human body. The circadian rhythm is a natural, internal process that regulates the sleep-wake cycle in the human body and repeats roughly every 24 hours. The circadian rhythm is mostly controlled by the hypothalamus, which is a part of the brain that coordinates both the autonomic nervous system and the activity of the pituitary gland, controlling body temperature, thirst, hunger, sleep, emotional activity, and other homeostatic systems. For example, when a subject is exposed to light, a signal is sent from the subject's eyes to their hypothalamus to suppress melatonin production. When melatonin production is suppressed, the feeling of being "sleepy" or "tired" decreases and thus may cause the subject to stay awake. Additionally, there is a link between melatonin and color temperature of light. For example, casinos can change the color temperature to towards a blue spectrum (e.g., cold) instead of the yellow spectrum (e.g., warm) to increase human arousal. Therefore, lights can be utilized in different environments, such as casinos, to keep people awake, alert, active, attentive, etc.

Disclosed herein are methods, systems, and apparatus that generate device control information to control one or more devices in a media environment to invoke an emotion, affect a mood, entertain, and/or affect an internal state of the people in the media environment. For example, systems disclosed herein generate a light drive waveform to control a light device in the media environment. In disclosed examples, systems generate the device control information based on media played back in the media environment. For example, systems disclosed herein utilize fingerprint generation or other media identification methods (e.g., codes, etc.) to identify media playing back in the media environment. Additionally, systems disclosed herein utilize the media identification to retrieve supplemental information about the identified media. In examples disclosed herein, supplemental information about the identified media includes, but is not limited to, tempo information, mood information, genre information, and color information. Systems, methods, and apparatus disclosed herein utilize the supplemental information to generate device control information that is based on the mood information, tempo information, and genre information of the media content. In this way, lighting may be controlled based on media being provided.

For example, examples disclosed herein include a light control generator that receives and analyzes supplemental information. In some examples, the light control generator analyzes the tempo information to determine beat patterns in the media. In examples disclosed herein, the light control generator generates a light drive waveform that informs a light controller to pulse one or more light emitting diodes (LEDs) of the light device in synchronization with the beat pattern of the media.

Additionally, examples disclosed herein analyze the mood information of the media to determine colors to associate with the media. For example, examples disclosed herein extract color information mapped to the moods of the media. Examples disclosed herein generate the light drive waveform to inform the light controller to change the color of the light device based on the color information. In examples disclosed herein, the light drive waveform informs the light controller to pulse colors of the light device, in accordance with the beat pattern and color information of the media.

In examples disclosed herein, the light control generator analyzes the mood information and/or genre information of the media to determine a light effect to be applied to the light drive waveform. A light effect may include adjusting the waveform shapes of the light drive waveform. Adjusting waveform shapes of the light drive waveform includes slowing and/or increasing the attack and decay times of light pulses, removing and/or adding light pulses in the light drive waveform, and applying any other type of modulation technique, filtering technique, etc., to the light drive waveform.

Examples disclosed herein store predetermined instructions corresponding to the light effects. For example, examples disclosed herein compile one or more executable files for one or more moods, genres, etc., and store them in a memory of the light control generator. The executable files may include algorithms, functions, etc., that adjust the light drive waveform based on the mood, genre, tempo, etc. For example, an executable file based on a mood (e.g., sad) may include an algorithm that slows down the light pulse (e.g., increases the attack time and increases the decay time). In some examples, an executable file can be initiated when the light controller generator receives a notification indicative of a light effect. For example, a media playback device may notify the light control generator that a mood-based effect has been requested. Additionally, examples disclosed herein receive instructions from the media playback device to initiate a genre-based effect and/or an energy-based effect.

FIG. 1 is an illustration of an example network diagram 100 to identify media content and generate device control information (DCI). As used herein, DCI refers to instructions, rules, policies, configuration information, or the like that changes the state of a device. The example network diagram 100 includes the example media presentation environment 102, an example network 104, an example content provider 106, an example device 108, an example content identifier generator 110, an example content identification system 112, and an example metadata database 114, an example light control generator 116, an example light controller 118, and an example light device 120.

In FIG. 1, the example network diagram 100 includes the media presentation environment 102 to present media content and corresponding lighting effects to one or more users. Additionally, the media presentation environment 102 performs watermark generation and/or signature generation for identifying the media content and associated metadata for the identified media content. In some examples, the media presentation environment 102 is a room of a household, a cabin of a vehicle, and/or any environment that includes the example device 108. In some examples, the media presentation environment 102 includes one or more media presentation devices, such as the device 108, to present streaming media to the one or more users.

In FIG. 1, the example network diagram 100 includes the network 104 to facilitate the delivery of media from the content provider 106 to the device 108. Additionally, the example network 104 facilitates the delivery of associated metadata from the metadata database 114 to the device 108. In some examples, the network 104 is a Local Area Network (LAN), a wireless LAN (WLAN), a wide area network (WAN), etc. The example network 104 may be implemented using any type of public or private network such as, but not limited to, the Internet, a telephone network, a LAN, a cable network, and/or a wireless network, or any combination thereof.

In FIG. 1, the example network diagram 100 includes the example content provider 106 to provide audio and other multimedia content to the device 108. For example, the content provider 106 may be a broadcaster, such as a radio station or radio network, which streams or transmits media over a radio channel to the device 108, and/or a web service, such as a website, that streams or transmits media over the network 104 to the device 108. The example content provider 106 communicates with the device 108 via the network 104.

The example device 108 is configured to present media content to one or more users. The device 108 may be implemented by, for example, television(s), set-top box(es), laptop(s) and/or other personal computer(s), tablet(s) and/or other mobile device(s), gaming device(s), and/or other device(s) capable of receiving a stream of audio and/or other multimedia content. In some examples, the device 108 includes a user interface that may provide the user access to control the content received from the content provider 106. Additionally, the user interface may provide the user access to control lighting effects of the example light device 120, determined by the light control generator 116.

In FIG. 1, the example media presentation environment 102 includes the example content identifier generator 110 to perform fingerprint generation on incoming media content. For example, the content identifier generator 110 may include a microphone and/or audio sensor to receive and/or monitor any incoming audio from the content provider 106. Additionally and/or alternatively, the example content identifier generator 110 may include an image sensor to monitor incoming video data from the example content provider 106. The example content identifier generator 110 analyzes the media content and determines pertinent features of the media content. For example, if the media content is an audio signal, the content identifier generator 110 determines the frequency composition of the audio as time progresses. In such an example, the content identifier generator 110 can determine the frequency composition by performing a Fourier transform on a short window of time of the audio signal, which decomposes that window of time over the frequencies of the window of time. The example content identifier generator 110 extracts characteristics from the frequency composition of the audio signal and generates a fingerprint and/or signature based on the characteristics. The example content identifier generator 110 may utilize a plurality of methods and techniques to identify, characterize, and/or extract the characteristics of the media content (e.g., the audio signal).

In examples where the media content is a video signal, the example content identifier generator 110 may analyze frames of data. Further, the content identifier generator 110 may extract features and/or characteristics of frames of video signal to generate fingerprints and/or signatures of the video signal. The example content identifier generator 110 may utilize a plurality of methods and/or techniques to analyze video signals and generate fingerprints and/or signatures.

The example content identifier generator 110 is in communication with the example content identification system 112 via the network 104. For example, the content identifier generator 110 transmits extracted fingerprints and/or signatures to the content identification system 112 for media identification purposes. The content identifier generator 110 does not identify the media content. The content identifier generator 110 is utilized to generate identifying features of the media content to assist in identifying the media content.

In FIG. 1, the example network diagram 100 includes the example content identification system 112 to identify media content monitored by the device 108. The example content identification system 112 may utilize signature-based media identification techniques. Unlike media monitoring techniques based on codes and/or watermarks included with and/or embedded in the monitored media content, fingerprint or signature-based media monitoring techniques generally use one or more inherent characteristics of the monitored media content during a monitoring time interval to generate a substantially unique proxy for the media content. Such a proxy is referred to as a signature or fingerprint, and can take any form (e.g., a series of digital values, a waveform, etc.) representative of any aspect(s) of the media content signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media content. Accordingly, the term "fingerprint" and "signature" are used interchangeably herein and are defined herein to mean a proxy for identifying media that is generated from one or more inherent characteristics of the media content.

Signature-based media monitoring generally involves determining (e.g., generating and/or collecting) signature(s) and/or fingerprint(s) representative of media content (e.g., an audio signal and/or a video signal) output by the content identifier generator 110 and comparing the signature(s) to one or more reference signatures corresponding to known (e.g., reference) media sources. Various comparison criteria, such as a cross-correlation value, a Hamming distance, etc., can be evaluated to determine whether a signature matches a particular reference signature. When a match between the signature and one of the reference signatures is found, the monitored media content can be identified as corresponding to the particular reference media represented by the reference signature that matched with the signature. Because attributes, such as an identifier of the media, a presentation time, a broadcast channel, etc., are collected for the reference signature, these attributes may then be associated with the monitored media content (e.g., output by the content provider 106) whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, the content identification system 112 may return a content identifier, to the device 108 and/or the light control generator 116, upon identifying the media content. For example, the content identification system 112 may utilize the media content attributes (e.g., identifier, presentation time, broadcast channel, etc.) as the content identifier. The example content identification system 112 accesses supplemental metadata in the example metadata database 114 by utilizing the content identifier. Additionally, if the content identification system 112 returns the content identifier to the example device 108 and/or the example light control generator 116, the example device 108 and/or the example light control generator 116 accesses supplemental metadata from the example metadata database 114.

In some examples, the device 108 and/or the light control generator 116 may request a content identifier from the content identification system 112 in an effort to access supplemental metadata from the metadata database 114. The content identifier can access supplemental metadata from the metadata database 114 because the content identifier may be mapped to corresponding metadata in the metadata database 114. Therefore, the device 108, the light control generator 116, and/or content identification system 112 may retrieve data stored in a location of memory in the example metadata database 114.

In FIG. 1, the example network diagram 100 includes the example metadata database 114 to store supplemental metadata corresponding to media content. The metadata database 114 may be implemented by any memory, storage device and/or storage disc for storing data such as, for example, flash memory, magnetic media, optical media, etc. Furthermore, the data stored in the metadata database 114 may be in any data format such as, for example, binary data, comma delimited data, tab delimited data, structured query language (SQL) structures, etc. While in the illustrated example the metadata database 114 is illustrated as a single database, the metadata database 114 may be implemented by any number and/or type(s) of databases. In the illustrated example, the metadata database 114 is hosted by a third party such as, for example, Gracenote, Inc. The Gracenote™ database may provide information corresponding to a moods, tempos, genres, color data and more for a plurality of music collections.

Figure 3A:
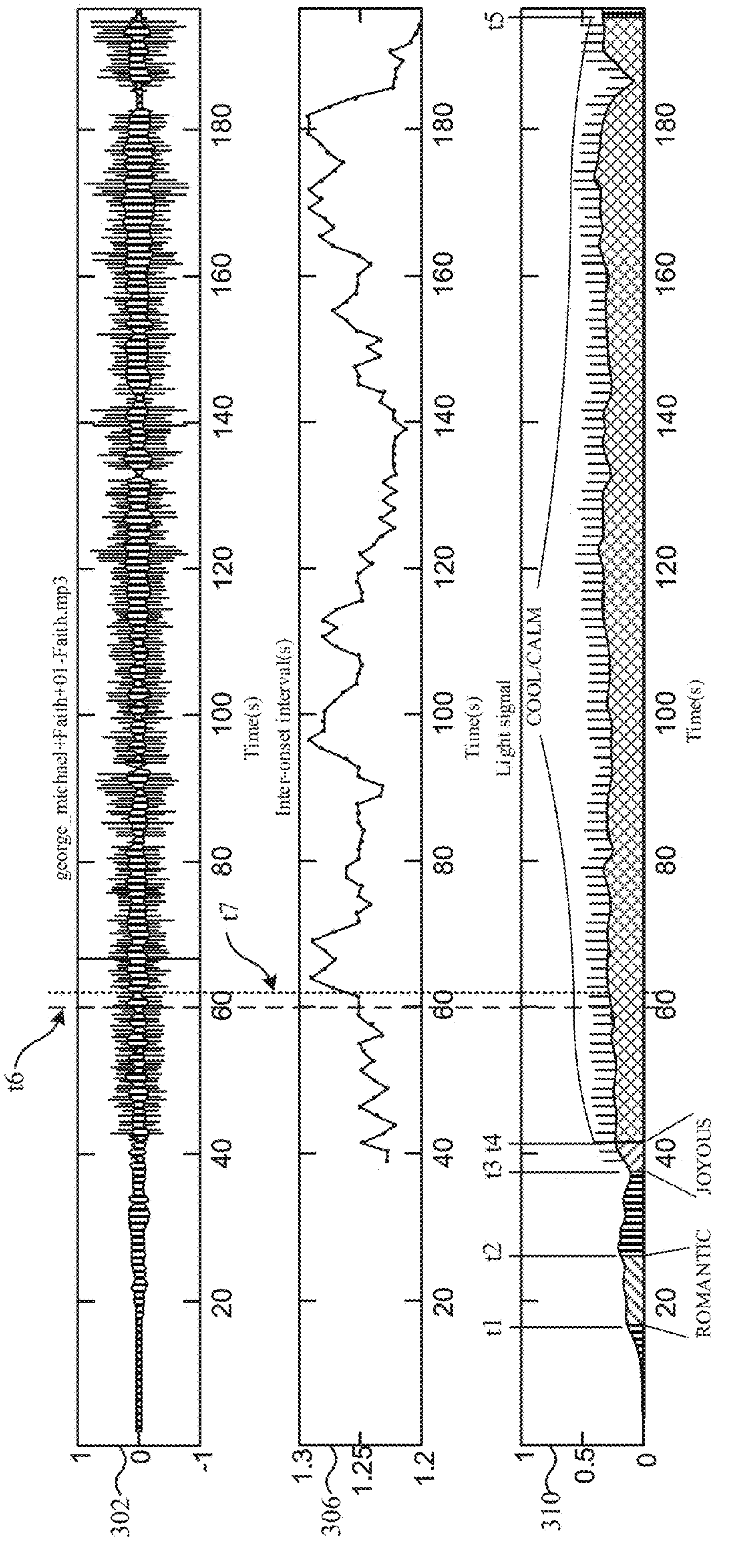
FIGS. 3A and 3B illustrate example signal plots to demonstrate device control information generated by the example light control generator of FIGS. 1 and 2.
Figure 3B:
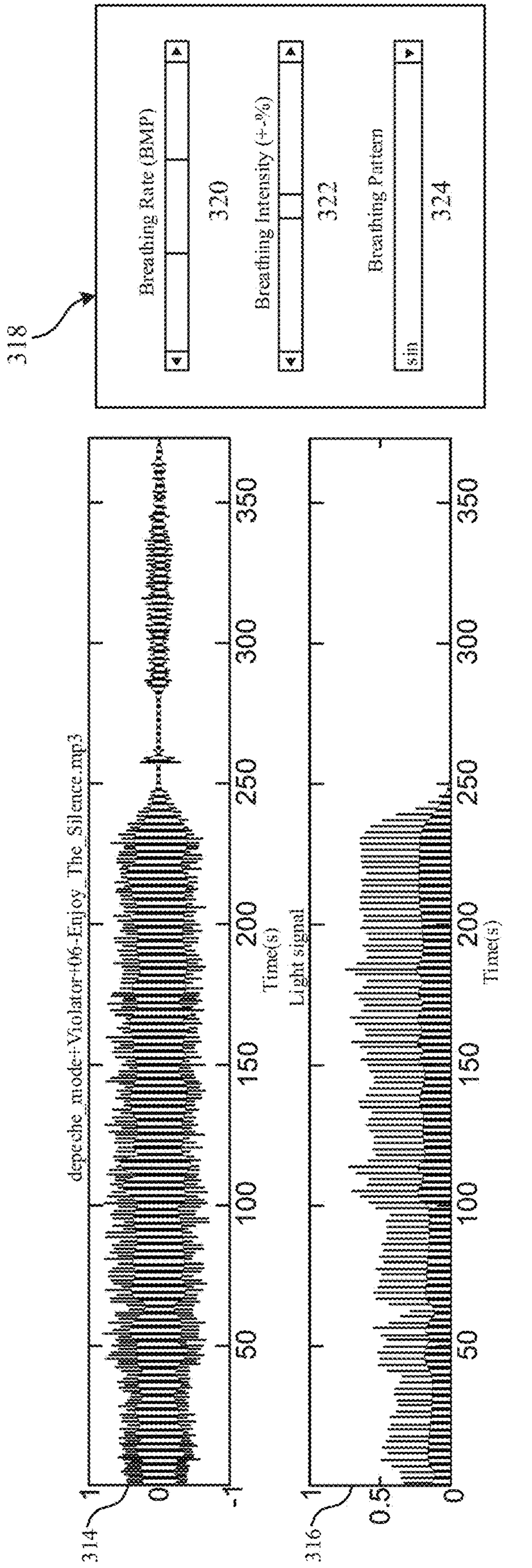

For example, the metadata database 114 provides supplemental metadata (e.g., information) that is tagged on a song-by-song basis. The supplemental metadata includes, but is not limited to, tempo data, mood data, color data, genre data, album cover data, energy level data, inter-onset interval data, and/or artist data. The tempo data is predetermined data corresponding to the beats per minute (BPM) of music. Tempo is the speed at which a passage of music occurs. For example, a time segment of music (e.g., the chorus of a song), may occur at a rate of 60 BPM (e.g., one beat per second). The tempo data can be used to identify the beat pattern, the inter-onset interval, etc. of an audio signal. An example illustration of tempo data is depicted in FIGS. 3A and 3B.

The mood data is predetermined data corresponding to one or more emotions the media evokes in a listener. In the metadata database 114, a song may be pre-classified and pre-tagged, by a mood classification engine, with one or more moods (e.g., top three moods). For example, by analyzing the instruments, the level of energy, the lyrics, the tone of voice, and more of music, a classification engine can classify and tag portions of the song with mood labels. For example, a mood classification engine may classify media content as a first mood classification type (e.g., happy) when media content includes cheerful lyrics, scripts including words such as happy, etc. In other examples, a mood classification engine may classify media content as a second mood classification type (e.g., peaceful) when media content includes a low energy level, instruments indicative of peace such as wind chimes and a harp, etc. In some examples, the mood classification engine generates a plurality of mood classification types that correspond to a plurality of moods and/or emotions.

In some examples, a classification engine can determine media content (e.g., a song) has many moods and/or emotions. In such an example, the introduction (intro) to a song may be slow and quiet with no lyrics, such that the intro can be tagged with the second mood classification type (e.g., peaceful). On the other hand, the chorus of the song may include romantic lyrics that include romantic words such as "love," "happy," etc., such that the mood classification engine tags the chorus with a third mood classification type (e.g., romantic). The example metadata database 114 includes mappings of plurality of media content (e.g., songs) to mood data (e.g., mood classification types). In some examples, the mood data is represented as a timeline of mood classification types, the timeline matching the timeline of the media content. For example, a song is 3 minutes and 45 seconds in length and each second is grouped together with a mood classification type. In some examples, the mood data is mapped to a color table in the metadata database 114. For example, the first mood classification type (e.g., happy) may be associated with a first color type (e.g., yellow).

The genre data is predetermined data corresponding to a category of the media content. For example, the genre of a song is a category of music characterized by similarities in form, style, or subject matter. For example, the genre of a song can be classified based on the overall mood of the song. The genre of a song can also be classified based on the artist who wrote the song, the types of instruments used in the song, etc. The example metadata database 114 stores genre data for a plurality of media content (e.g., songs) to utilize for determining DCI.

Color data is predetermined information provided to a user or system corresponding to the color of a mood, genre, etc. A color can be associated with a mood (e.g., a mood classification type). For example, a second color type (e.g., pink) can be associated with the third mood classification type (e.g., romantic), a third color type (e.g., blue) can be associated with a fourth mood classification type (e.g., sad), a first color type (e.g., yellow) can be associated with a first mood classification type (e.g., happy), and a fourth color type (e.g., purples) can be associated with the second mood classification type (e.g., peaceful). A mood (e.g., a mood classification type) can have many different colors. Likewise, a group of colors can be indicative of a genre. For example, hard rock music can be associated with red, black, and white, while country music can be associated with red, white, and blue. The example metadata database 114 includes predetermined color tables for media content, where one or more color types are tagged with the classification types of the song. For example, a song in which the intro is the second mood classification type (e.g., peaceful), the fourth color type (e.g., purple) is tagged with a timestamp equal to the timestamp of the intro. Additionally, if the chorus of the same song is tagged with the third mood classification type, the second color type is tagged with one or more timestamps equal to the one or more timestamps of the chorus. The color data may be utilized for determining DCI. The color data is described in further detail below in connection with FIG. 3A.

In FIG. 1, the example media presentation environment 102 includes the example light control generator 116 to generate DCI to provide to the example light controller 118. The example light control generator 116 may receive and transmit communication signals to and from the network 104 via an Ethernet, a digital subscriber line (DSL), a telephone line, a coaxial cable, a USB connection, a Bluetooth connection, and any other type of wireless communication. The example light control generator 116 is in communication with the example content identification system 112 and the example metadata database 114 via the network 104. Additionally, the example light control generator 116 is coupled to the example light controller 118 via hardwired connection, a communication bus, or any wireless communication method.

In operation, the example light control generator 116 receives a content identifier from the example content identification system 112. The content identifier may be indicative of the media content playing back at device 108. The example light control generator 116 utilizes the content identifier to access supplemental metadata from the metadata database 114. For example, the light control generator 116 retrieves tempo data and mood data from the metadata database 114 corresponding to the content identifier. Further, the example light control generator 116 utilizes the tempo data to determine the downbeats and/or onsets of the tempo. Additionally, the example light control generator 116 utilizes the mood data and/or the color data to determine a color timeline for the media content.

The example light control generator 116 combines the determined information into a light drive waveform, wherein the light drive waveform is an information package, such as an executable file, provided to the example light controller 118. For example, the light drive waveform may be computer readable instructions, a digital signal, an analog signal, etc., that informs LEDs to adjust brightness levels based on the corresponding tempo data and mood data of the media content. In this manner, the light drive waveform may generate light pulses. The light pulses may pulse LEDs in synchronization with prominent beats of the media content (e.g., music). In some examples, the light pulses are colored light pulses. Colored light pulses are pulses of light with an indicated color, such as the first color type, the second color type, etc. Further, the example light control generator 116 adjusts the waveforms of the light drive waveform. For example, the light control generator 116 adjusts attack and decay times of light pulses in the light drive waveform, applies smoothing filters to the light drive waveform, etc. The example light control generator 116 is described in further detail below in connection with FIG. 2.

In FIG. 1, the example media presentation environment 102 includes the example light controller 118 to control the LEDs of the example light device 120. The example light controller 118 is coupled to the example light control generator 116 and the example light device 120 via a hardwired connection, a communication bus, or any wireless communication method. The example light controller 118 may be a pulse width modulation (PWM) generator, a sinusoidal pulse width modulation (SPWM) generator, a modified pulse width modulation (MPWM) generator, a pulse frequency modulation (PFM) generator, or any other type of voltage controlled regulator. The example light controller 118 controls the light device 120 based on input (e.g., DCI, light drive waveform, etc.) received from the example light control generator 116.

In FIG. 1, the example media presentation environment 102 includes the example light device 120 to operate in synchronization with the media content playing back at the device 108. The example light device 120 is coupled to the example light controller 118 via a hardwired connection and/or any wireless communication method. In some examples, the light device 120 may be a lamp, a thin film LED strip, one or more LED bulbs, or any other type of LED device. The example light device 120 may be located under one or more seats in a cabin of a vehicle, in a ceiling of a room, on the outside of a house, underneath the chassis of a vehicle, etc.

The example light device 120 includes one or more red, green, blue (RGB) LED circuits. An RGB LED circuit includes a red LED, a blue LED, and a green LED packaged into a transparent or semitransparent shell. Red, green, and blue are base colors. A composite color (e.g., non-red, non-green, or non-blue color) can include three base colors (e.g., RGB). Each base color can be represented by eight bits (e.g., eight bits corresponds to a decimal value of 255, 2^8=255). The decimal value associated with eight bits can correspond to a brightness of the base color (e.g., 255 corresponds to a brighter base color and 0 corresponds to a dimmer base color). The eight bits of each base color can be increased and/or decreased in coordination to achieve a composite color. For example, the decimal code of the RGB values for a composite color of orange can be R(255), G(69), and B(0). Therefore, the example light controller 118 generates PWM or PFM signals that adjust the RGB values to compose a color. PWM and PFM signals correspond to the light drive waveform.

Figure 2:
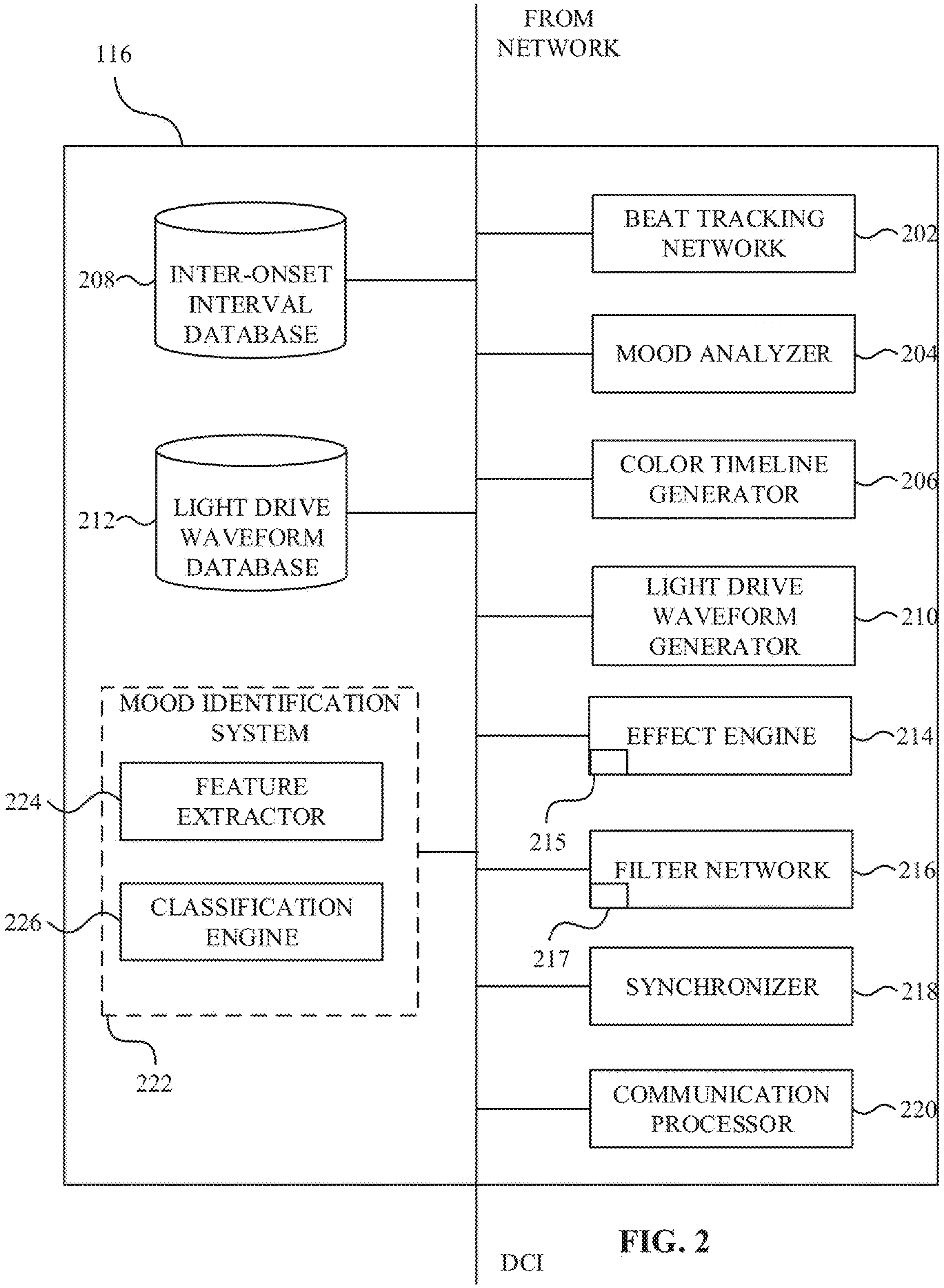
FIG. 2 is a block diagram illustration of an example light control generator of FIG. 1 to generate the device control information.

FIG. 2 is a block diagram illustration of the example light control generator 116 of FIG. 1 to generate the DCI. The example light control generator 116 of FIG. 2 includes an example beat tracking network 202, an example mood analyzer 204, an example color timeline generator 206, an example inter-onset interval database 208, an example light drive waveform generator 210, an example light drive waveform database 212, an example effect engine 214, an example filter network 216, an example synchronizer 218, an example communication processor 220, and an example mood identification system 222.

In FIG. 2, the example light control generator 116 includes the example beat tracking network 202 to determine a beat synchronization analysis of the media content. In examples described hereinbelow, media content can be referred to as audio, such as an audio signal. The example beat tracking network 202 allows real-time beat tracking of audio signals, and particularly, of music. In some examples, the beat tracking network 202 includes a tempo analyzer, an onset detection circuit, a transient detection circuit, an energy analyzing circuit, and any other type of circuit that may assist in real-time beat tracking of an audio signal. In some examples, the beat tracking network 202 may alternatively include Recurrent Neural Networks (RNNs), deep Bayesian Networks, and other machine learning engines to pre-process audio signals and determine probable values of beat times (e.g., a likelihood that the beat will occur at a rate of 60 bpm).

In a first example operation, the example beat tracking network 202 retrieves the audio signal playing back at example device 108. The example beat tracking network 202 may utilize the onset detection circuit to capture abrupt changes in the audio signal at the beginning of a transient region of notes. In music, the onset is the beginning of a musical note. For example, the onset corresponds to a transient in the musical note, such that the transient is the increased energy of the note. During onset detection, the example beat tracking network 202 determines the change of sound intensity, in an audio signal, between one time instant and the next time instant. Further, the change of sound intensity is compared to a difference threshold, where the difference threshold is the minimum level of stimulation that a person can detect 50 percent of the time. When the change in sound intensity meets and/or exceeds the difference threshold, an onset rise point is determined for the one time instant. In some examples, an onset rise point is the time point where the sound energy first increases. The example beat tracking network 202 can determine all of the onset rise points in the audio signal to generate an inter-onset interval graph. In other examples, the onset detection circuit of the beat tracking network 202 may utilize the Fast Fourier Transform (FFT) to convert the audio signal into individual spectral components that can be analyzed. The individual spectral components of the audio signal can be used to learn the pattern of beats.

When the example beat tracking network 202 determines the media onsets and/or pulses of the audio signal, the example beat tracking network 202 compares tempo data to the media onsets. For example, the beat tracking network 202 utilizes the content identifier to retrieve pre-determined tempo data from the metadata database 114 of FIG. 1. Then the beat tracking network 202 aligns the media onsets with the tempo data to determine the location of each significant beat in the audio signal. For example, the beat tracking network 202 determines timestamps for the media onsets in the audio signal, the timestamps indicative of a time the media onsets occur in the audio signal.

In a second example operation, the example beat tracking network 202 receives an audio signal input (e.g., from the example device 108 or the example content provider 106). The audio signal input may be a frame of audio with an offset or without an offset. Further, the example beat tracking network 202 determines the tempo of the input audio signal by analyzing the tempo data. For example, the content identifier may identify a timestamp of the audio signal. The example beat tracking network 202 may utilize the timestamp to determine the beats per minute of the audio signal by locating, in the tempo data, the tempo corresponding to the timestamp. Furthermore, the beat tracking network 202 locates the media onsets.

In some examples, the beat tracking network 202 generates an inter-onset interval graph based on the results of the onset detection circuit. An inter-onset interval is a time between the beginnings or attack points of successive events or notes (e.g., the interval between media onsets). Typically, a song has equal intervals between media onsets. For example, the inter-onset interval is the difference of time between every two consecutive beats, in seconds. The inter-onset interval graph may be utilized to correct the estimated beats from the beat tracking network 202 if the beats deviate. For example, in operation, the beat tracking network 202 may be tracking the wrong media onsets (e.g., not the prominent beats) in the audio signal.

The example beat tracking network 202 may store inter-onset interval graphs in the example inter-onset interval database 208. The example beat tracking network 202 may tag the inter-onset interval graph with the content identifier for subsequent retrievals. For example, when the content identification system 112 of FIG. 1 identifies the media playing back at the device 108, the example beat tracking network 202 may query the inter-onset interval database 208 for an inter-onset interval graph associated with the identified media content, utilizing the content identifier. By storing inter-onset interval graphs in the inter-onset interval database 208, the example light control generator 116 reduces subsequent processing time by retrieving, and not computing, the inter-onset interval graph for the audio signal.

Additionally, the example beat tracking network 202 may utilize an energy detection circuit to determine the downbeats of the audio signal playing back at the device 108. A downbeat, in music, is an accented beat and usually the first beat of a bar. In music, a bar is a segment of time corresponding to a specific number of beats in which each beat is represented by a particular note value. The boundaries of the bar are indicated by vertical bar lines. The example beat tracking network 202 may determine downbeats of the audio signal to determine a beat pattern in the audio signal. For example, the downbeats may be equally spaced, making it easy to determine a rhythm and/or beat pattern of the audio signal. The example beat tracking network 202 determines the beat pattern of the audio signal to generate a light drive waveform that correlates with the beat pattern.

In a third example operation, the beat tracking network 202 extracts a tempo value from the tempo data to provide to the example light drive waveform generator 210. In some examples, the beat tracking network 202 may receive an instruction to enable, initiate, etc., a breathing effect. In other examples, the beat tracking network 202 may default to the breathing effect. As used herein, a breathing effect corresponds to how fast light pulses increase and decrease in amplitude, in such a manner that resembles the way a chest expands and contracts when the human, animal, etc., inhales and exhales. The beat tracking network 202 extracts the tempo value from the tempo data to inform the example light drive waveform generator 210 the rate at which light pulses should occur. For example, the beat tracking network 202 may extract the beats per minute of the audio signal and provide the information to the light drive waveform generator 210. In this manner, the example light drive waveform generator 210 generates light pulses at an equal rate as the beats per minute.

In FIG. 2, the example light control generator 116 includes the example mood analyzer 204 to determine the moods of the media content. The example mood analyzer 204 may retrieve, by utilizing the content identifier, mood data associated with the content identifier. For example, the mood data includes mood labels (e.g., romantic, peaceful, serious, calm, angry, happy, etc.) mapped to time segments of the audio signal. The example mood data is mapped to the color table. The example mood analyzer 204 may align the mood data with the tempo data (e.g., in order of time segments). Further, the example mood analyzer 204 initiates the color timeline generator 206.

In some examples, the mood analyzer 204 receives three moods for the audio signal. In other examples, three moods for each of the time segments in the audio signal. For example, the metadata database 114 of FIG. 1 may include the top three moods for the media, where the top three moods correspond to probabilities that the media invokes at least one of those top three moods. In some examples, the mood analyzer 204 may select the one mood of the top three moods based on the mood with the highest probability value. The example mood analyzer 204 may utilize the selected mood to provide to the color timeline generator 206.

In some examples, the metadata database 114 does not include predetermined mood data for a content identifier. In such an example, the mood analyzer 204 may not receive mood data and notifies the color timeline generator 206.

In FIG. 2, the example light control generator 116 includes the color timeline generator 206 to generate color information based on the metadata, the color information to inform the lighting device 120 to change a color state. The color information may be indicative of one or more mood classification types of the media content. In response to initiation by the mood analyzer 204, the color timeline generator 206 retrieves a color table from the example metadata database 114, utilizing the content identifier. The color table may include the color types (e.g., base colors and composite colors) associated with mood classification types. The example color timeline generator 206 aligns the color table with the mood data to generate color information. For example, the color information may be a color timeline, wherein the timeline may be one or more arrays of decimal values that correspond to composite colors and/or base colors and additionally correspond to a point of time in the audio signal, the point of time determined by the mood data. For example, the mood analyzer 204 determines a timestamp for the mood classification type in the media content, therefore the color array corresponds to that timestamp. For example, at 2 minutes and 35 seconds into the audio signal, the audio signal is tagged with the third mood classification type. Therefore, an array with RGB values equal to (255, 180, 180), corresponding to the composite color pink, is located at 2 minutes and 35 seconds in the color timeline. In some examples, the color information generator 206 packages the color information in an information package. For example, RGB values for each second of the audio signal are packaged into an information package to be provided to the light drive waveform generator 210 for generating a light drive waveform.

In some examples, the mood analyzer 204 does not initiate the color timeline generator 206. In such an example, the metadata database 114 includes pre-determined color information and/or color data instructions for a media content. For example, the metadata database 114 stores predetermined information indicative of color types mapped to timestamps (e.g., a predetermined color timeline, color instructions, etc.) in the media content (e.g., audio signal, video signal, etc.). The color information may be transmitted, as packaged information, to the example light controller 118. In some examples, the color information is transmitted separately from the light drive waveform. For example, RGB values are provided to the light controller 118 in a separate package of instructions.

In some examples, the color timeline generator 206 receives notifications from the mood analyzer 204 indicative that mood data is not identified in the metadata database 114. In this manner, the color timeline generator 206 queries the metadata database 114 for album cover data. For example, album cover data includes information corresponding to the image produced for front of the packaging of a commercially released audio recording product, or album. The album cover data can be utilized to set the color state of the light device 120 when mood data is not identified for the identified media content. For example, the color timeline generator 206 can notify the light controller 118 to set the light device 120 to be the dominant color of the album cover data. In other examples, if the media content is a live radio broadcast of a sporting event, the example color timeline generator 206 can retrieve, from the metadata database 114, information corresponding to team color data. For example, team color data includes information corresponding to the one or more team color types (e.g., Chicago Bears are white, orange, and blue). Further, the example color timeline generator 206 may set the color and/or colors of the example light device 120 to the identified team color data of one of the sports teams.

In FIG. 2, the example light control generator 116 includes the inter-onset interval database 208 to store inter-onset interval graphs generated by the example beat tracking network 202. The example inter-onset interval database 208 may be coupled to the example beat tracking network 202, the example mood analyzer 204, the example color timeline generator 206, the example light drive waveform generator 210, the example effect engine 214, the example filter network 216, the example synchronizer 218, the example communication processor 220, and/or the example mood identification system 222. The example inter-onset interval database 208 may be implemented by any memory, storage device and/or storage disc for storing data such as, for example, flash memory, magnetic media, optical media, etc. Furthermore, the data stored in the inter-onset interval database 208 may be in any data format such as, for example, binary data, comma delimited data, tab delimited data, structured query language (SQL) structures, etc. While in the illustrated example the inter-onset interval database 208 is illustrated as a single database, the inter-onset interval database 208 may be implemented by any number and/or type(s) of databases.

In FIG. 2, the example light control generator 116 includes the example light drive waveform generator 210 to generate light drive waveforms corresponding to the media content. A light drive waveform may be DCI. For example, the light drive waveform generator 210 obtains metadata corresponding to media and generates DCI based on the metadata, the DCI to inform the lighting device 120 to enable consecutive light pulses. Additionally, the DCI may control the light effect of the example light device 120 of FIG. 1. For example, the DCI may include information corresponding to what color type and/or color state the light device 120 is to emit. Additionally, the DCI may include information corresponding to the consecutive pulses the light device 120 is to enable. For example, the beat tracking network 202 determines the beat pattern is 20 bpm, therefore the light drive waveform generator generates consecutive light pulses that occur every 3 seconds. The example light drive waveform may be a set of bit values (e.g., ones and zeros), instructions, rules, policies, configuration information, or the like that changes the state of a device (e.g., the light device 120).

In some examples, a light pulse could be any wave of light that meets an energy threshold for a duration of time. For example, the light pulse could be when an amplitude of a square wave that meets an energy threshold, the amplitude of a sawtooth wave that meets the energy threshold, etc. In some examples, the energy threshold is determined by the example device 108, wherein a user selects a brightness intensity.

In some examples, the light drive waveform generator 210 communicates with the beat tracking network 202, the effect engine 214, the filter network 216, the synchronizer 218, the communication processor 220, and/or the mood identification system 222. The example light drive waveform generator 210 communicates with the example beat tracking network 202 to determine an estimated length of time between two or more media onsets in the media content, the two or more media onsets being two or more respective characteristics of the media content, respectively. For example, the light drive waveform generator 210 determines the estimated length of time between two or more media onsets in the media content based on the timestamps, determined by the beat tracking network 202, for the two or more media onsets.

Further, the light drive waveform generator 210 synchronizes the light drive waveform with the media onsets of the media content. For example, the light drive waveform generator 210 obtains an estimated length of time between each downbeat, media onset, transient, etc. that occurs in the audio signal associated with the media content (e.g., audio signal) playing back at the device 108. Further, the light drive waveform generator 210 compares the estimated length of time to a time threshold, the time threshold corresponding to a desired time between consecutive light pulses. In some examples, when the time threshold is not satisfied, the light drive waveform generator 210 increases the estimated length of time, the increased estimated length of time to be analyzed to generate light pulse spacing. Light pulse spacing is the space of time between a first light pulse and a second light pulse in the consecutive light pulses.

In some examples, the time threshold may be indicative of a minimum duration of time of the light pulse spacing. If the estimated length of time does not meet and/or satisfy the time threshold, the example light drive waveform generator 210 increases the duration of time between light pulses by an effect factor. An effect factor can be determined based on pre-determined input from the user and/or manufacturer. For example, a user interface of the device 108 can receive input information indicative of the type of lighting effect the user wishes to experience. The types of effects may include a mood-based effect, an energy-based effect, and a genre-based effect. The types of effects are described below in connection with the example effect engine 214.

When the light drive waveform generator 210 increases the duration of time between light pulses, the number of consecutive light pulses that are enabled are reduced. In examples disclosed herein, the light drive waveform generator 210 generates light drive waveforms with reduced light pulses to engage a user who is accessing the media content. However, the example light control generator 116 does not over-engage the user. For example, over-engaging the user may refer to generating fast-pulse light drive waveforms that resemble a discotheque, a strobe light, a night club, a rock concert, etc. In some examples, engaging the user may refer to generating light drive waveforms that include slower pulses relative to the time threshold. Furthermore, the example light drive waveform generator 210 synchronizes the light pulses with the media onsets based on the increased duration of time.

In other examples, the light drive waveform generator 210 receives a tempo value from the beat tracking network 202. The light drive waveform generator 210 may generate light pulses based on the tempo value. For example, instead of generating light pulses at pre-computed timestamps (e.g., at locations where the media onsets occur), the light drive waveform generator 210 generates light pulses at a pulse per minute that equals the beats per minute. In some examples, the light drive waveform generator 210 halves, quarters, etc., the pulsing rate. For example, the device 108 may provide instructions to the light drive waveform generator 210 indicative to reduce the pulsing rate by a percentage. In other examples, the light drive waveform generator 210 reduces the pulsing rate when the pulsing rate does not satisfy the time threshold.

In FIG. 2, the example light control generator 116 includes the example light drive waveform database 212 to store light drive waveforms. The example light drive waveform database 212 is coupled to the example beat tracking network 202, the example mood analyzer 204, the example color timeline generator 206, the example light drive waveform generator 210, the example effect engine 214, the example filter network 216, the example synchronizer 218, the example communication processor 220, and/or the example mood identification system 222. The example light drive waveform database 212 may be implemented by any memory, storage device and/or storage disc for storing data such as, for example, flash memory, magnetic media, optical media, etc. Furthermore, the data stored in the example light drive waveform database 212 may be in any data format such as, for example, binary data, comma delimited data, tab delimited data, structured query language (SQL) structures, etc. While in the illustrated example the light drive waveform database 212 is illustrated as a single database, the light drive waveform database 212 may be implemented by any number and/or type(s) of databases.

In FIG. 2, the example light control generator 116 includes the example effect engine 214 to adjust the light drive waveform based on an effect type. The example light drive waveform generator 210 initiates the example effect engine 214. For example, the light drive waveform generator 210 provides the light drive waveform to the example effect engine 214 to apply and effect on the light drive waveform. The example effect engine 214 includes a memory 215 to store information corresponding to light effect types. For example, the memory 215 may include predetermined specifications for the mood-based effect, the genre-based effect, and/or energy-based effect.

In operation, the example effect engine 214 receives instructions corresponding to a desired effect type. For example, the device 108 sends instructions to the effect engine 214 indicative that the effect type is either the mood-based effect, the energy-based effect, or the genre-based effect.

The mood-based effect includes adjusting the light drive waveform based on the prominent mood of the media content. For example, the effect engine 214 may initialize an envelope with predetermined specifications, stored in the memory 215. The predetermined specifications may be an attack parameter and a decay parameter that are configured based on the mood. The initialized envelope may modulate a pulse of the light drive waveform based on the predetermined specification. An envelope is circuit or module that includes an input terminal and an output terminal, the input terminal receives the light drive waveform and the output terminal outputs the modulated signal, depending on the light drive waveform. In some examples, the envelope is triggered based on an event. Such events include a pulse in the light drive waveform. When the envelope is triggered by the pulse, the envelope may modulate the pulse based on the pre-defined attack parameters and decay parameters. An attack parameter refers to an amount of time it takes the pulse to reach the maximum amplitude or the end of the increase in the pulse. A decay parameter refers to an amount of time it takes for the pulse to decrease to some specified sustain level (e.g., the level of output). Adjusting the attack times and decay times of the pulse results in a visually and physically different light signal relative to the original pulse generated by the light drive waveform generator 210.

For a mood-based effect, the predetermined specifications are tagged with a mood label. For example, a long attack time and a short decay time may be tagged with the romantic mood label, wherein the long attack time and short decay time generate a breathing effect (e.g., the amplitude of the pulse gradually increases and then quickly decreases back to the original amplitude level, similar to breathing in and breathing out). There may be many combinations of attack parameters and decay parameters for a plurality of moods. These combinations of parameters may configure one or more envelopes in response to receiving the instructions from the device 108, indicative of the effect type.

The energy-based affect includes adjusting the light pulses based on the energy increase for each beat in the audio signal. As used herein, energy increase, energy decrease, energy level, etc., of an audio signal corresponds to a volume of the audio signal (e.g., the decibel (dB) value for points in the audio signal correspond to volume of the audio signal). In some examples, the beat tracking network 202 may determine the beat strength for each beat in the audio signal. Such a beat strength is indicative of the amplitude of each beat in the audio signal. Therefore, the example effect engine 214 may initialize the example filter network 216 or an internal filter, to adjust the amplitude of the of the light pulses in the light drive waveform based on the energy level, beat strength, amplitude, etc.

For example, the effect engine 214 provides the light pulse to the filter network 216 to adjust the amplitude of the light pulse. In some examples, the effect engine 214 includes one or more internal filters, utilized to adjust the amplitude of the light pulses. The internal filters may be initialized in response to receiving the pulse. The example effect engine 214 determines how to adjust the amplitude of the light pulses, based on the beat strength. For example, a segment of the audio signal is approximately 1 kHz and includes 3 beats, wherein the beat tracking network 202 determines the strength of the three beats: the first beat is equal to 40 decibels (dB), the second beat is equal to 80 dB, and the third beat is equal to 50 dB. The light drive waveform generator 210 generates three pulses, where one pulse occurs at the first beat, a second pulse occurs at the second beat, and a third pulse occurs at the third beat. The example effect engine 214 decreases the amplitude of the first pulse, utilizing the internal filters or initializing the example filter network 216, because the first pulse is the weakest (40 dB is less power than 80 dB and 50 dB). Further, the example effect engine 214 does not filter the amplitude of second pulse because the second pulse is associated with the loudest beat, therefore the second pulse can increase to a maximum brightness level. Lastly, the example effect engine 214 decreases the amplitude of the third pulse, utilizing the internal filters or initializing the example filter network 216, to a medium amplitude level, because the third pulse is not the strongest but the not the weakest. The example filter network 216 is described in further detail below.

The genre-based effect includes adjusting the light pulses based on the genre of audio signal. In some examples, when effect engine 214 receives instructions indicative of the genre-based effect, the example effect engine 214 retrieves genre data from the example metadata database 114 corresponding to the content identifier. The example memory 215 may include predetermined specifications tagged with a genre label, the predetermined specifications to configure the envelope to modulate a pulse. For example, predetermined attack time and decay time combinations may be associated with a genre label. For example, Rock or Electronica utilizes a fast attack parameter and Easy Listening utilizes a slow attack parameter. The example effect engine 214 configures the envelope with the predetermined specification based on the genre data. The envelope, after configuration, may be triggered in response to the light pulses.

In some examples, if the effect engine 214 does not receive instructions indicative of the effect type, the effect engine 214 may default to a breathing effect. The light drive waveform is determined to breathe when the attack parameters and decay parameters are slow enough to mimic the time a chest expands and contracts. The breathing effect includes a breathing rate (e.g., the pulsing rate), a breathing intensity, and a breathing pattern. The effect engine 214 may receive instructions to increase or decrease the breathing rate. For example, a faster breathing rate corresponds to a faster pulsing rate and a slower breathing rate corresponds to a slower pulsing rate. Additionally, the effect engine 214 may receive instructions to adjust the breathing intensity. For example, the breathing intensity corresponds to the intensity of light that the pulse emits. The intensity (or luminance) of a light is measured between 1 and 0, where 1 equals maximum brightness and 0 indicates the light is off. Therefore, if the amplitude of the pulse is 0.5, the light device 120 emits half the maximum brightness. Instructions may be indicative to increase or decrease the intensity of the pulse.

The example effect engine 214 may receive instructions to change the breathing pattern. For example, the breathing pattern corresponds to the waveform of the light pulse. For example, a sine wave is the default waveform in which the light drive waveform generator 210 generates the light pulses. However, the example effect engine 214 can change the sine wave waveform of the light pulse to a square wave, a triangle wave, a sawtooth wave, etc. In some examples, the effect engine 214 initiates the example filter network 216 to change the light pulse wave shape.

In FIG. 2, the example light control generator 116 includes the example filter network 216 to adjust the light drive waveform. The example filter network 216 may be configured utilizing network synthesis, where a desired response is determined and a network of filters are produced that outputs, or approximates to, that response. For example, the device 108 provides instructions, indicative of an effect type (e.g., the response), to the filter network 216. Further, one or more filters are produced and/or initiated, to filter out specific frequencies or components of the light drive waveform based on the effect type. The example filter network 216 includes a memory 217 to store executable files. The executable files are generated based on configuration information. For example, configuration information corresponds to a desired effect type. Configuration information may include a function, algorithm, program, application, and/or other code specifications to generate an executable file based on a mood-based effect, a genre-based effect, an energy-based effect, and/or a tempo based effect. The executable files includes a number of different executable sections, where each executable section is executable by a specific processing element (e.g., a CPU, a GPU, a VPU, and/or an FPGA). The executable files are generated for Ahead of Time paradigms. For example, the executable files are compiled in the filter network 216 before execution occurs. In this manner, an executable file is executed upon receipt of a trigger (e.g., an instruction from the device 108, an instruction from the effect engine 214, an instruction from the communication processor 220, etc.).

For example, the filter network 216 receives an instruction indicative of the energy-based effect, and the executable file corresponding to the energy-based effect is initiated. In this manner, when the filter network 216 receives light drive waveforms, the executable file executes particular functions based on the information in the light drive waveform. For example, information indicative of a pulse may cause a function of the executable file to adjust an amplitude of the pulse, as described above in connection with the effect engine 214.

In some examples, the executable files include, regardless of the effect type, a function, algorithm, program, application, etc., that adjusts the light drive waveform at a color type change in the light drive waveform. For example, the filter network 216 determines one or more locations in the light drive waveform indicative of a color type change. An approximating function of the executable file may operate to smooth a data set at the determined one or more locations in the light drive waveform that corresponds to the color type change. An approximating function captures pertinent patterns in a data signal (e.g., the pertinent color type between two color types), while leaving out noise or other fine-scale structures and rapid phenomena in the signal. For example, the approximating function may determine that similar RGB values exist between two composite colors (e.g., purple and pink may have a similar blue value). The executable files include the function to adjust the waveform between a color type change to accommodate for abrupt mood changes in the audio signal. For example, the audio signal may include adjacent segments that each have a different mood classification type. Since mood classification type is correlated with a specific color type, the adjacent audio segments may have two different color types. In some examples, the first color type is different from the second color type (e.g., yellow vs pink). Such different color types, when emitted via the light device 120, may be visually distracting or visually displeasing to the user experiencing the color type change. Therefore, the approximating function is utilized. In this manner, the color type change between adjacent color segments is gradual, rather than abrupt. The executable files in the example filter network 216 may utilize any function, algorithm, program, application, etc., to smooth the data corresponding to the change from a first color type to a second color type in the light drive waveform.

In some examples, the filter network 216 changes the breathing pattern of the light drive waveform. For example, information indicative of a breathing pattern may cause a function of the executable file to input the sine wave to a Schmitt trigger to output a square wave or a triangle wave, depending on the way the Schmitt trigger is configured. In some examples, the effect engine 214 provides the information indicative of the desired breathing pattern to the filter network 216. For example, the filter network 216 may receive configuration information corresponding to configuring the Schmitt trigger to output a triangle wave.

In FIG. 2, the example light control generator 116 includes the example synchronizer 218 to ensure light drive waveform synchronization with the media content. The example synchronizer 218 is coupled to the example beat tracking network 202, the example mood analyzer 204, the example color timeline generator 206, the example light drive waveform generator 210, the example effect engine 214, the example filter network 216, the example communication processor 220, and/or the example mood identification system 222. The example synchronizer 218 may utilize beat maps to synchronize the light pulses with the beat map of the media content. In some examples, the beat maps are determined by the example beat tracking network 202 and stored in the inter-onset interval database 208. A beat map may be a graph representing time versus audio strength of the audio signal. In some examples, the beat map is similar to the inter-onset interval graph. The example synchronizer 218 may include a fingerprint generator, similar to the example content identifier generator 110 of FIG. 1, to generate fingerprints periodically to determine the time the audio signal is playing back at the device 108.

For example, the synchronizer 218 determines the fingerprint matches at 1 minute and 15 seconds into the audio signal. Further, the example synchronizer 218 analyzes the beat map to locate the beat strength at 1 minute and 15 seconds and adjusts the light drive waveform accordingly. For example, the synchronizer may adjust the pulsing time of the light drive waveform to match the beats in the beat map. In some examples, the synchronizer 218 generates fingerprints every minute to determine if the pulsing time is in beat with the audio signal. In some examples, the device 108 may play back the media content slower or faster than the light drive waveform generator 210 generates the light drive waveform. In this example, the synchronizer 218 ensures synchronization across the media presentation environment 102.

In some examples, the synchronizer 218 determines a termination timestamp of the media content. For example, the synchronizer 218 determines a timestamp in the tempo data and/or the light drive waveform that is associated with the media content ending and/or terminating. The example synchronizer 218 utilizes the termination timestamp to determine the beat strength of the media content at a duration of time before the termination timestamp, the beat strength indicative of an energy of the media content at the duration of time before the termination timestamp. The duration of time before the termination timestamp may be 5 seconds, 10 seconds, 20 seconds, etc., before the end of a song, a video, etc.

The synchronizer 218 may remove the light pulses at the duration of time before the termination timestamp when the energy of the media content satisfies an energy threshold. The energy threshold may correspond to a lower energy level of the media content relative to the average energy level of the media content. For example, when the beat strength of the media content is low, light pulses are to not be enabled. If there are undetectable or small beats (e.g., beats that meet the energy threshold), light pulses are to be removed and/or disabled. If the synchronizer 218 determines the beat strength does not meet the energy threshold, the synchronizer does not remove the light pulses from the end of the light drive waveform.

Additionally, the example synchronizer 218 gradually reduces the amplitude (e.g., the intensity) of the light drive waveform at the end of the duration of the light drive waveform. The example synchronizer 218 removes the light pulses and reduces the amplitude at the end of the light drive waveform to generate a fading effect during media content transitions.

In some examples, the synchronizer 218 is deactivated when the default settings are indicative of the breathing effect. Since the breathing effect matches the tempo rate, synchronicity is unnecessary. The human brain compensates for the synchronicity between the breathing pulses and audio signal, as long as the pulses breathe faster than the slowest structures and/or parts of the song. In this manner, periodic checking of the audio signal location and the waveform pulsing is not necessary. Therefore, the synchronizer 218 can be deactivated.

In FIG. 2, the example light control generator 116 includes the example communication processor 220 coupled to the example beat tracking network 202, the example mood analyzer 204, the example color timeline generator 206, the example light drive waveform generator 210, the example effect engine 214, the example filter network 216, the example synchronizer 218, and/or the example mood identification system 222. The example communication processor 220 is hardware which performs actions based on received information. For example, the communication processor 220 provides instructions to at least one of the example beat tracking network 202, the example mood analyzer 204, the example color timeline generator 206, the example light drive waveform generator 210, the example effect engine 214, the example filter network 216, the example synchronizer 218, and/or the example mood identification system 222 based on data received from the example device 108. Such data includes instructions, supplemental metadata, etc. In some examples, the instructions are effect type instructions. Effect type instructions may include configuration information for each of the example light drive waveform generator 210, the example effect engine 214, the example filter network 216, and/or the example synchronizer 218.

Additionally, the communication processor 220 controls where data is to be output from the light control generator 116. For example, the communication processor 220 receives information, instructions, a notification, etc., from the light drive waveform generator 210, the effect engine 214, the filter network 216, and/or the synchronizer 218 indicative to retrieve supplemental content from the metadata database 114, indicative to send the light drive waveform to the light controller 118, etc.

In FIG. 2, the example light control generator 116 includes the example mood identification system 222 to identify an overall mood of the media content when the example metadata database 114 does not include mood data for the media content. In some examples, the content identifier determined by the content identification system 112 does not have associated supplemental content. For example, the metadata database 114 may not have predetermined supplemental content for every media content generated in the world. This may be due to available memory, newly produced media (e.g., an artist releases a new album after the metadata database 114 is populated), etc. The example mood identification system 222 is initiated in response to an instruction from the example mood analyzer 204 or the example communication processor 220. In some examples, the mood analyzer 204 and/or the communication processor 220 sends an instruction to the mood identification system 222 when neither the mood analyzer 204 nor the communication processor 220 receives an acknowledgment, a packet of data, etc., from the metadata database 114.

The example mood identification system 222 includes an example feature extractor 224 to extract and identify features of media content. The example feature extractor 224 is implemented by a logic circuit such as a silicon-based processor executing instructions, but it could additionally or alternatively be implemented by an ASIC(s), a PLD(s), a FPLD(s), an analog circuit, and/or other circuitry. The example feature extractor 224 accesses the audio samples of the media content. The example feature extractor 224 of FIG. 1 processes the received samples to identify one or more features of the samples such as, for example, zero crossings, roll off power, brightness, flatness, roughness, minor third interval power, major third interval power, irregularity, chroma, main pitch, a key, etc. In examples disclosed herein, the example feature extractor 224 computes new values for each feature at discrete time intervals (e.g., every ten milliseconds, every two hundred milliseconds, every second, etc.). In some examples, two or more of the features are used. In other examples, three or more of such features are employed. In some examples, temporal features are extracted using specialized wavelets. Wavelet based sets can capture core structures in rhythms. Example wavelets include Daubechies wavelets, Marr wavelets, etc. In some examples, new wavelets may be used to accurately capture and/or otherwise extract rhythmic structures of music. The output of the feature extractor 224 is transmitted to the classification engine 226.

The example classification engine 226 of FIG. 2 is implemented by a logic circuit such as a silicon-based processor executing instructions, but it could additionally or alternatively be implemented by an ASIC(s), a PLD(s), a FPLD(s), an analog circuit, and/or other circuitry. The example classification engine 226 of this example utilizes the features extracted from samples associated with the media content to generate a mood model. In the illustrated example, the mood model is stored in a database of the mood identification system 222. In examples disclosed herein, one or more mood models are used to classify media such as audio (e.g., music) as associated with one or more different emotions and/or moods based on attributes extracted by the feature extractor 224. In the illustrated example, the mood model(s) are implemented by an artificial neural network (ANN). However, in some examples, the mood model(s) are algorithm(s) such as, for example, a naïve-Bayesian algorithm, hierarchical Bayesian clustering algorithm, linear regression algorithms, non-linear regression algorithms, Support Vector Machines, etc. In some examples, additional constraints are added to the classification model. For example, some emotions are opposite of each other and do not appear at the same time (e.g., anger is the opposite of peace). Thus, in some examples, the classification engine 226 will not build a model that simultaneously classifies media as exhibiting two opposing emotional states (e.g., at substantially the same time). Other examples release this constraint. In the illustrated example, interactions of the classified emotions are used to guide the classification model. For example, fear and courage are a couplet defining a negative emotional value through a positive emotional value. Other example emotional couplets include, for example, joy and sadness, peace and anger, desire and disgust, etc.

In some examples, fuzzy logic models that can identify co-existence of different emotions are used. Some such fuzzy logic models may ignore that some emotions are completely independent or mutually exclusive. For example, the fuzzy logic model may indicate that there can be sadness and courage evoked at the same time.

In the illustrated example, the example classification engine 226 processes unknown audio (e.g., audio not mapped to supplemental content) to identify emotion(s) and/or mood(s) associated therewith based on the model. The example classification engine 226 of FIG. 2 creates a second by second classification of the emotion(s) of the audio. In some examples, different window sizes are used (e.g., a five second window, a ten second window, etc.). In some examples, a moving window is used. In some examples, the windows overlap. In others, the windows do not overlap. In some examples, a fuzzy weighted composition of multiple data points to a single identification per window (for example, every ten seconds) is used.

In operation, the example light control generator 116 provides the audio signal, corresponding to media that evokes an unknown emotion, to the feature extractor 224. The example feature extractor 224 processes the audio signal to identify features of the audio signal. The example classification engine 226 receives features from the example feature extractor 224 and outputs a mood classification (e.g., happy, sad, etc.) based on the features. The output mood classification is provided to the example color timeline generator 206. The example color timeline generator 206 retrieves color data associated with the mood classification type from the example metadata database 114. For example, if the mood classification is a second mood classification type (e.g., peaceful), the second mood classification type is mapped in the metadata database 114 to the fourth color type. Additionally, the example mood identification system 222 stores the mood classification in the metadata database 114 and maps the mood classification to the content identifier. In this manner, when the same content identifier is generated by the content identification system 112, the mood analyzer 204 and/or the communication processor 220 can retrieve mood data corresponding to the content identifier.

The example mood identification system 222 determines mood data in real time. For example, the mood identification system 222 is not initialized until the device 108 plays back unclassified media content. In this manner, the mood identification system 222 may not classify a mood for every segment of audio. Instead, the example mood identification system 222 determines a likelihood for a prominent mood of the audio, and outputs a mood classification based on the likelihood. For example, the classification engine 226 may include a number of predetermined mood classification types (e.g., happy, sad, mellow, angry, and peaceful). Further, the example classification engine 226 may output a probability for each mood classification type, such that each probability is indicative of a likelihood that the predetermined mood classification type is the prominent mood classification type of the audio. The probabilities may be a percentage, a ratio, a decimal value, a confidence value, etc. For example, the content identifier is indicative of the song title "Happy" by artist Pharrell Williams. The example classification engine 226 may output a high confidence value for the first mood classification type (e.g., happy) and low confidence values for the second and third mood classification types (e.g., peaceful and romantic) because of features identified by the example feature extractor 224. The mood classification type with the highest confidence value is tagged to the media content and stored in the metadata database 114 for future use by the example mood analyzer 204.

In some examples, when the content identifier does not have corresponding mood data, the example communication processor 220 initializes the color timeline generator 206 to retrieve a default color type for use by the light drive waveform generator 210. For example, when the mood analyzer 204 does not receive an acknowledgement receipt from the metadata database 114, via the network 104, the mood analyzer 204 transmits a message to the device 108 and/or the communication processor 220 asking for an instruction. Such an instruction may be indicative to retrieve a default color from the color map stored in the example metadata database 114 or utilize the example mood identification system 222.

While an example manner of implementing the light control generator 116 of FIG. 1 is illustrated in FIG. 2, one or more of the elements, processes and/or devices illustrated in FIG. 2 may be combined, divided, re-arranged, omitted, eliminated and/or implemented in any other way. Further, the example beat tracking network 202, the example mood analyzer 204, the example color timeline generator 206, the example light drive waveform generator 210, the example effect engine 214, the example filter network 216, the example synchronizer 218, the example communication processor 220, the example feature extractor 224, the example classification engine 226, and/or, more generally, the example light control generator 116 of FIGS. 1 and 2 may be implemented by hardware, software, firmware and/or any combination of hardware, software and/or firmware. Thus, for example, any of the example beat tracking network 202, the example mood analyzer 204, the example color timeline generator 206, the example light drive waveform generator 210, the example effect engine 214, the example filter network 216, the example synchronizer 218, the example communication processor 220, the example feature extractor 224, the example classification engine 226 and/or, more generally, the example light control generator 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example beat tracking network 202, the example mood analyzer 204, the example color timeline generator 206, the example light drive waveform generator 210, the example effect engine 214, the example filter network 216, the example synchronizer 218, the example communication processor 220, the example feature extractor 224, and/or the example classification engine 226 is/are hereby expressly defined to include a non-transitory computer readable storage device or storage disk such as a memory, a digital versatile disk (DVD), a compact disk (CD), a Blu-ray disk, etc. including the software and/or firmware. Further still, the example light control generator 116 of FIGS. 1 and 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIGS. 3A and 3B illustrate example signal plots to demonstrate device control information generated by the example light control generator 116 of FIGS. 1 and 2. FIG. 3A includes an example first signal plot 302 corresponding to an audio signal, an example second signal plot 306 corresponding to onsets of the audio signal, and an example third signal plot 310 corresponding to a light drive waveform.

In FIG. 3A, the example first signal plot 302 corresponds to an audio signal. For example, the first signal plot 302 illustrates the tempo of the song title "Faith" by artist George Michael. The first signal plot 302 is a time domain plot. The first signal plot 302 includes an x-axis indicative of time, in seconds, and a y-axis indicative of the normalized amplitude of the audio signal. The tempo is the rate the audio signal occurs, for example, tempo describes the relatively fast or slow speed at which the beats in music are perceived.

In FIG. 3A, the example second signal plot 306 corresponds to the onsets of the audio signal. The example second signal plot 306 illustrates an inter-onset interval plot to represent the distance, in time, between two onsets in the audio signal (e.g., the song "Faith"). For example, the second signal plot 306 depicts an onset in the audio signal with a dot, and further depicts the distance, in time, between two onsets by a connecting line from a first onset dot to a second onset dot. In the example second signal plot 306, the x-axis represents the time in seconds (s), and the y-axis represents media onset amplitude. In some examples, the beat tracking network 202 of FIG. 2 determines the second signal plot 306 utilizing methods described above.

In operation, the example beat tracking network 202 provides the second signal plot 306 to the light drive waveform generator 210 to generate a light drive waveform based on the onsets in the second signal plot 306. Additionally and/or alternatively, the example beat tracking network 202 provides the second signal plot 306 to the example synchronizer 218. In this example, the synchronizer 218 utilizes the second signal plot 306 to align pulses in the light drive waveform with the onsets in the second signal plot 306. Further, the example beat tracking network 202 stores the second signal plot 306 in the example inter-onset interval database 208 for future use by the beat tracking network 202, the synchronizer 218, and/or any other device that may analyze the second signal plot 306 for processing.

In FIG. 3A, the example third signal plot 310 illustrates an example light drive waveform, generated by the example light drive waveform generator 210. In the illustrated example, the x-axis of the third signal plot 310 represents the time in seconds (s) of the waveform and the y-axis of the third signal plot 310 represents the intensity of the light pulse (e.g., the maximum and minimum brightness). In the example third signal plot 310, segments of time are tagged with a mood label. For example, from time t1 to time t2, the audio signal (e.g., the song "Faith") is the third mood classification type, so the third signal plot 310 is tagged with "ROMANTIC." Additionally, from time t3 to time t4, the mood of the audio signal is joyous, so the example third signal plot 310 is tagged with "JOYOUS." Furthermore, from time t4 to time t5, the mood of the audio signal is cool/calm, so the example third signal plot 310 is tagged with "COOL/CALM." The mood labels are analyzed by the example mood analyzer 204 of FIG. 2 to determine the corresponding colors for the example color timeline generator 206 of FIG. 2 to extract from the example metadata database 114. In this example, the light drive waveform generator 210 generates the third signal plot 310 to include information corresponding to a color to be emitted by the light device 120. For example, between time t1 and time t2, the third signal plot 310 is purple to represent "ROMANTIC," between time t3 and time t4, the third signal plot 310 is orange to represent "JOYOUS," and between time t4 and time t5, the third signal plot 310 is blue to represent "COOL/CALM." In the illustrated examples, the colors are represented by dashed, dotted, and solid lines. For example, the dashed line represents the color purple, the dotted line represents the color orange, and the solid line represents the color blue.

In some examples, the filter network 216 of FIG. 2 adjusts the third signal plot 310 at a color change in the light drive waveform. For example, an approximating function operates to smooth the transition between orange and blue at time t4.

The example light drive waveform generator 210 pulses the third signal plot 310 at each time point where an onset occurs. For example, at time t6, an onset occurs in the audio signal (e.g., the song "Faith"). The light drive waveform generator 210 increases the amplitude of the third signal plot 310, at time t6, to approximately 0.5 (e.g., half of the maximum brightness). In some examples, the length of time the amplitude of one of the light pulses is increased (e.g., the length of the pulse) is determined by the example effect engine 214 of FIG. 2. For example, the effect engine 214 may adjust the pulse based on a mood, an energy level, a genre, or any other feature of the audio signal. Additionally, the example effect engine 214 determines how quickly and/or slowly the third signal plot 310 increases and/or decreases in amplitude. At time t7, an onset does not occur in the second signal plot 306. Therefore, the amplitude of the third signal plot 310 decreases to approximately 0.3 (e.g., a third of the maximum brightness), which is the average amplitude of the third signal plot 310.

Turning to FIG. 3B, an example tempo signal plot 314 and an example light drive waveform 316 are illustrated. The example of FIG. 3B also includes an example user interface 318, an example first control 320, an example second control 322, and an example third control 324.

In FIG. 3B, the example tempo signal plot 314 illustrates tempo data, retrieved from the example metadata database 114, corresponding to the song titled "Enjoy the Silence" by Depeche Mode. In some examples, the content identification system 112 identifies the media content (e.g., the song) and the example communication processor 220 retrieves the song title (e.g., Enjoy the Silence), the song artist (e.g., Depeche Mode), the tempo data (e.g., the tempo signal plot 314), etc. from the example metadata database 114.

The example tempo signal plot 314 is a time domain plot. The example tempo signal plot 314 includes an x-axis indicative of time in seconds and a y-axis indicative of the normalized amplitude of the audio signal. In some examples, the light drive waveform generator 210 utilizes the tempo signal plot 314 to generate the light drive waveform 316.

In FIG. 3B, the example light drive waveform 316 illustrates DCI that corresponds to the tempo signal plot 314. The example light drive waveform 316 includes an x-axis indicative of time, in seconds, and a y-axis indicative of luminance and/or intensity of the light device 120. In the illustrated example of FIG. 3B, the example light drive waveform generator 210 generates the light drive waveform 316 based on the example tempo signal plot 314. For example, the light drive waveform generator 210 generates pulses (e.g., light pulses) at a rate equal to the beats per minute of the tempo signal plot 314. The example light drive waveform 316 may include colors (e.g., color information) corresponding to the mood of the media content. The example light drive waveform 316 may be provided to the light controller 118 as DCI.

In FIG. 3B, the example user interface 318 is an interface which allows a user to control generation of the light drive waveform 316. The example user interface 318 may be implemented as a part of the device 108. For example, the user interface 318 may be a graphical user interface (GUI), push buttons, turn knobs, a liquid crystal display (LCD) touch screen such as a tablet, a computer monitor, etc. located within and/or as a part of the device 108.

The example user interface 318 of FIG. 3B includes the example first control 320 to provide instructions to the example effect engine 214. The first control 320 corresponds to the breathing rate (e.g., the pulsing rate) of the light drive waveform 316. For example, the first control 320 may provide instructions to the effect engine 214 to adjust the pulsing rate of the light drive waveform 316. In some examples, the user moves a track bar to the right to instruct the effect engine 214 to increase the pulsing rate. In other examples, the user moves the track bar to the left to instruct the effect engine 214 to decrease the pulsing rate. Increasing and decreasing the pulsing rate corresponds to a number of light pulses that occur throughout the length the media content is played back to the user.

The example user interface 318 of FIG. 3B includes the example second control 322 to provide instructions to the example effect engine 214. The second control 322 corresponds to the breathing intensity (e.g., the intensity of light that the pulse emits) of the light drive waveform 316. For example, the second control 322 may provide instructions to the effect engine 214 to adjust the intensity of the light drive waveform 316. In some examples, the user moves a track bar to the right to instruct the effect engine 214 to increase the intensity. In other examples, the user moves the track bar to the left to instruct the effect engine 214 to decrease the intensity. Increasing and decreasing the light intensity corresponds to the brightness and/or dimness the example light device 120 will emit.

The example user interface 318 of FIG. 3B includes the example third control 324 to provide instructions to the example effect engine 214. The third control 324 corresponds to the breathing pattern (e.g., the waveform of the light pulses) of the light drive waveform 316. For example, the third control 324 may provide instructions to the effect engine 214 to adjust the shape of the waveform of the light drive waveform 316. The breathing pattern affects the attack time and decay time of the light pulses. In some examples, the user is provided a list of waveform options via a combo box (e.g., a dropdown menu). For example, options include sin (e.g., sine wave), sawtooth, triangle, square, etc. In some examples, when a user selects one of the options in the third control 324 combo box, instructions are provided to the example effect engine 214. In some examples, the third control 324 sends instructions to the filter network 216 to change the breathing pattern of the light drive waveform 316. For example, a user selection may cause a function of the executable file to enable a Schmitt trigger to output the selected breathing pattern.

The example user interface 318 of FIG. 3B is not limited to the control options illustrated in FIG. 3B. In some examples, the user interface 318 may include control options corresponding to color. For example, the user interface 318 may present the user with an option to instruct the color timeline generator 206 to change the color of the light pulses. In other examples, the user interface 318 provides the user an option to turn off and/or turn on the light device 120. In some examples, the user interface 318 provides the user an option to instruct the light control generator 116 to automatically generate DCI. For example, the light control generator 116 generates DCI based on pre-determined specifications and pre-computed mood data, as described in examples above in connection with FIG. 2. In this manner, the user interface of FIG. 3B provides the user the ability to manipulate the DCI and/or provides the user the ability of hands-off control of DCI.

FIG. 4 illustrates an example system 400 generating DCI at a first time (time t6) and at a second time (time t7) and producing light effects at the first time and the second time based on the DCI. The example system 400 is illustrated as a vehicle at the first time and at the second time. The example system 400 includes an example media device 404 that transmits audio signals to a media unit 406. The media unit 406 processes the audio signals and transmits the signals to an audio amplifier, which subsequently outputs the amplified audio signal to be presented via an output device 408.

The example media device 404 of the illustrated example of FIG. 4 is a mobile device (e.g., a cell phone). The example media device 404 stores or receives audio signals, from a content provider (e.g., the content provider 106 of FIG. 1), corresponding to media and is capable of transmitting the audio signals to other devices. In the illustrated example of FIG. 4, the media device 404 transmits audio signals to the media unit 406 wirelessly. In some examples, the media device 404 may use Wi-Fi, Bluetooth, and/or any other technology to transmit audio signals to the media unit 406. In some examples, the media device 404 may interact with components of a vehicle or other devices for a listener to select media for presentation in the vehicle. The media device 404 may be any device capable of storing and/or accessing audio signals. In some examples, the media device 404 may be integral to the vehicle (e.g., a CD player, a radio, etc.).

The example media unit 406 of the illustrated example of FIG. 4 is capable of receiving audio signals and processing them. In the illustrated example of FIG. 4, the example media unit 406 receives audio signals from the media device 404 and processes them to generate DCI. The example media unit 406 is capable of identifying audio signals based on generating identifiers to be embedded in the audio (e.g., fingerprints, watermarks, signatures, etc.). The example media unit 406 is additionally capable of accessing metadata from a database (e.g., the example metadata database 114 of FIG. 1) corresponding to the audio signal. In some examples, the metadata is stored in a storage device of the media unit 406. In some examples, the metadata is accessed from another location (e.g., from a server via the network 104). Further, the example media unit 406 is capable of generating DCI to control a light device 410 inside the cabin of the system 400. The example media unit 406 is additionally capable of monitoring audio that is being output by the output device 408 to determine beat synchronization in real time. In some examples, the example media unit 406 is included as part of another device in a vehicle (e.g., a car radio head unit). In some examples, the example media unit 406 is implemented as software and is included as part of another device, available either through a direct connection (e.g., a wired connection) or through a network (e.g., available on the cloud). In some examples, the example media unit 406 may be incorporated with the output device 408 and may output audio signals itself following processing of the audio signals. In some examples, the media unit 406 includes the content identifier generator 110, the light control generator 116, and the light controller 118 of FIG. 1.

The example audio output device 408 of the illustrated example of FIG. 4 is a speaker. In some examples, the audio output device 408 may be multiple speakers, headphones, or any other device capable of presenting audio signals to a listener. In some examples, the output device 408 may be capable of outputting visual elements as well (e.g., a television with speakers).

The example light device 410 of the illustrated example of FIG. 4 is a dome light. However, in some examples, the light device 410 may be any type of accent lighting device, over-head lighting device, etc. The example light device 410 is coupled to a control device (e.g., the example light controller 118 of FIG. 1). The example light device 410 may operate based on a light drive waveform, provided by the example media unit 406. In the illustrated example of FIG. 4, the light drive waveform provided to the light device 410 is the third signal plot 310 of FIG. 3A. In this example, the media device 404 is receiving the song "Faith" by artist George Michael, from a content provider (e.g., the example content provider 106).

In operation, the example media unit 406 monitors the media content output (e.g., played back) by the example device 108 and/or the example output device 408. Further, the example media unit 406 identifies the media content and retrieves corresponding metadata from the metadata database (e.g., metadata database 114). For example, the media unit 406 may retrieve the first signal plot 302 corresponding to the song "Faith." Further, the example media unit 406 generates an inter-onset interval plot. For example, the beat tracking network 202 of FIG. 2 generates the second signal plot 306.

Further, the example media unit 406 aligns mood data, color data, and onsets with the first signal plot 302 (e.g., tempo data). For example, the light drive waveform generator 210 utilizes the information provided by the mood analyzer 204, the color timeline generator 206, and the beat tracking network 202 to align the data in chronological order. In such an example, the light drive waveform generator 210 generates the light drive waveform (e.g., the third signal plot 310 of FIG. 3A) for the song "Faith." In some examples, the media unit 406 extracts a tempo value from the tempo data (e.g., the first signal plot 302) to generate the light drive waveform. For example, the media unit 406 generates light pulses at a pulsing rate that equals the beats per minute.

In some examples, the media unit 406 provides the third signal plot 310 (e.g., the light drive waveform) to a device controller (e.g., the light controller 118) to adjust the light device 410 based on the color timeline and the light pulses. For example, the light device 410 may pulse, change colors, breathe, and more. The light device 410 pulses to the beat of the audio signal.

In some examples, the pulsing is represented in the system 400 at the first time and at the second time. For example, the media device 404 and/or output device 408 of the first time plays back the song "Faith" at time t6. At time t6, there is a pulse in the third signal plot 310 corresponding to an onset in the second signal plot 306. Therefore, the brightness of the example light device 410 increases. Next, the media device 404 and/or the output device 408 plays back the song "Faith" at time t7. At time t7, there is not an onset in the second signal plot 306. Therefore, the example light device 410 emits an average brightness of light at the second time.

In the illustrated example of FIG. 4, the light device 410 emits a colored light (e.g., blue), represented by the solid lines. The colored light corresponds to the third signal plot 310 of FIG. 3A, and further, to the mood of the audio signal at a specified time. For example, at time t6, the third signal plot 310 pulses. Therefore, the brightness of the example light device 410 increases at time t6 (e.g., illustrated with a greater number of solid lines relative to the number of solid lines of the system 400 at time t7).

While the illustrated example system 400 of FIG. 4 is described in reference to a device control information generator implementation in a vehicle, some or all of the devices included in the example system 400 may be implemented by any environment, and in any combination. For example, the system 400 may be in an entertainment room of a house, wherein the media device 404 may be a gaming console, a virtual reality device, a set top box, or any other device capable of accessing and/or transmitting media. Additionally, in some examples, the media may include visual elements as well (e.g., television shows, films, etc.).

A flowchart representative of example hardware logic, machine readable instructions, hardware implemented state machines, and/or any combination thereof for implementing the media presentation environment 102 of FIG. 1 and the light control generator 116 of FIGS. 1 and 2 are shown in FIGS. 5-9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 5-9, many other methods of implementing the example media presentation environment 102 and the example light control generator 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 5:
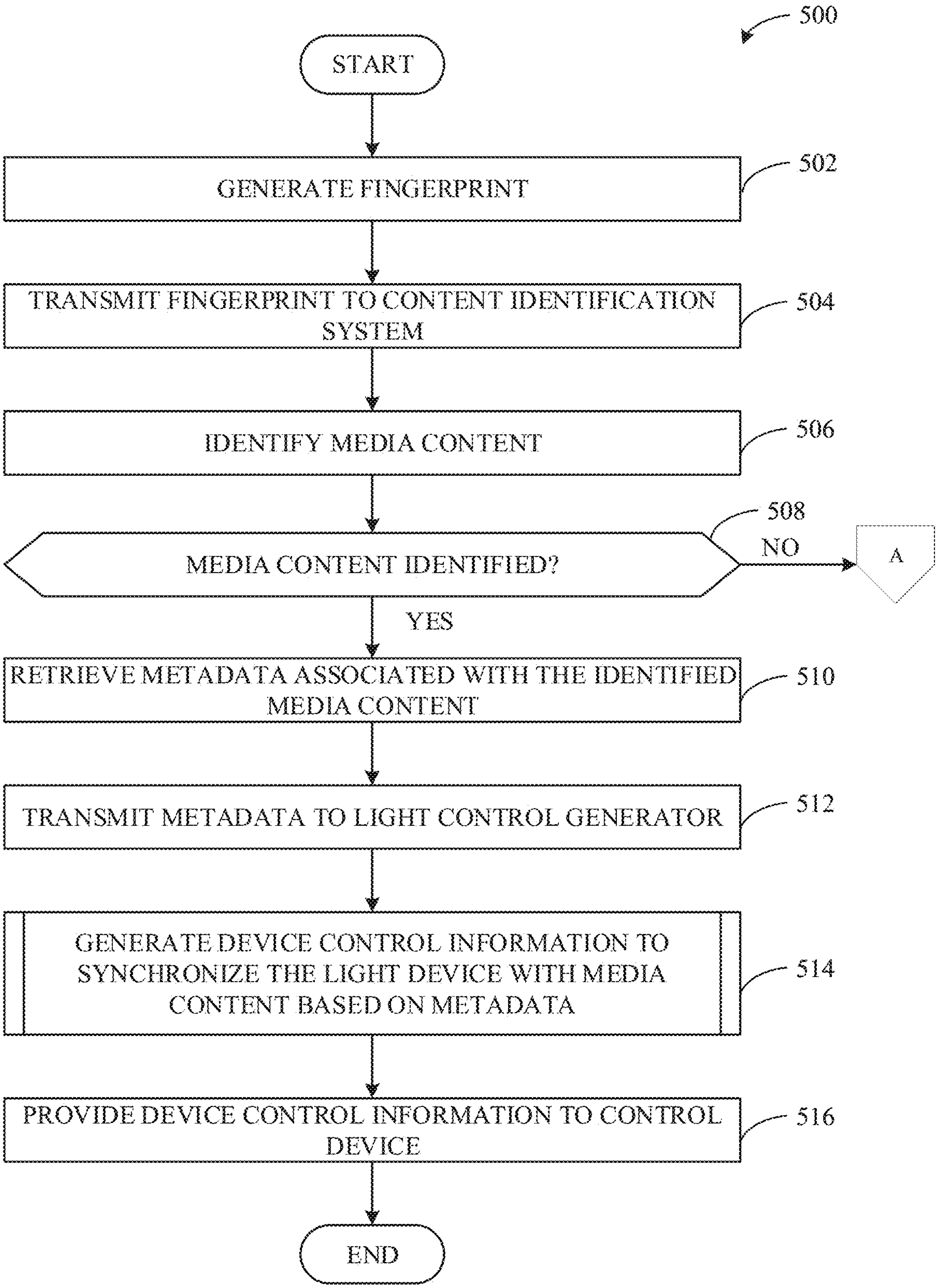
FIG. 5 is a flowchart representative of machine readable instructions that may be executed to implement the example network diagram of FIG. 1.

FIG. 5 is a flowchart representative of machine readable instructions 500 which may be executed to implement the example network diagram 100 of FIG. 1. With reference to the preceding figures and associated descriptions, the example machine readable instructions 500 begin with the example content identifier generator 110 generating a fingerprint (Block 502). For example, the content identifier generator 110 generates a fingerprint of an audio signal played back by the example device 108. Further, the example content identifier generator 110 transmits the fingerprint to the content identification system 112 (Block 504) via the network 104.

The example content identification system 112 identifies the media content (Block 506) provided by the example content identifier generator 110. For example, the content identification system 112 compares the fingerprint to one or more predetermined fingerprints stored in a fingerprint database and may or may not identify a match. The example content identification system 112 determines if the media content has been identified (Block 508). For example, the content identification system 112 may not find a match (e.g., Block 508 returns a NO), and control turns to the machine readable instructions 600 of FIG. 6.

In other examples, the content identification system 112 identifies a match in the fingerprint database (e.g., Block 508 returns a YES). In this manner, the example content identification system 112 generates a content identifier. In some examples, the content identifier is provided to the example light control generator 116, via the network 104.

If the content identification system 112 provides the content identifier to the light control generator 116, the light control generator 116 retrieves metadata associated with the identified media content (Block 510). For example, the content identifier is mapped to tempo data, mood data, color data, and more of the media content. In this manner, the example light control generator 116 retrieves tempo data, mood data, color data, etc., associated with the content identifier, from the example metadata database 114.

In some examples, the content identification system 112 retrieves the supplemental metadata associated with the identified media content (Block 510). In such an example, the content identification system 112 transmits the metadata to the example light control generator 116 (Block 512). Regardless of the device that retrieves the metadata from the example metadata database 114, the example light control generator 116 receives and utilizes the metadata.

The light control generator 116 generates device control information to synchronize the light device 120 with media content based on the metadata (Block 514). Additional machine readable instructions are described in FIGS. 7-9 to generate device control information.

The example light control generator 116 provides the device control information to the example light controller 118 to control the example light device 120 (Block 516). For example, the light control generator 116 monitors media content in real time and periodically sends device control information to the example light controller 118. The example light controller 118 utilizes the device control information to synchronize the example light device 120 with the media content. For example, the light device 120 pulses with the beats in an audio signal.

The process of FIG. 5 ends when the device control information is no longer provided to the light controller 118. For example, if the device 108 discontinues playing back media content (e.g., a user paused the media, there is no content being provided by the content provider 106, etc.), the light control generator 116 stops generating device control information. However, the machine readable instructions 500 of FIG. 5 can be repeated when the example content identifier generator 110, monitoring the playback of the device 108, generates a fingerprint (Block 502).

FIGS. 6-9 are flowcharts representative of machine readable instructions which may be executed to implement the example light control generator of FIGS. 1 and 2.

Figure 6:
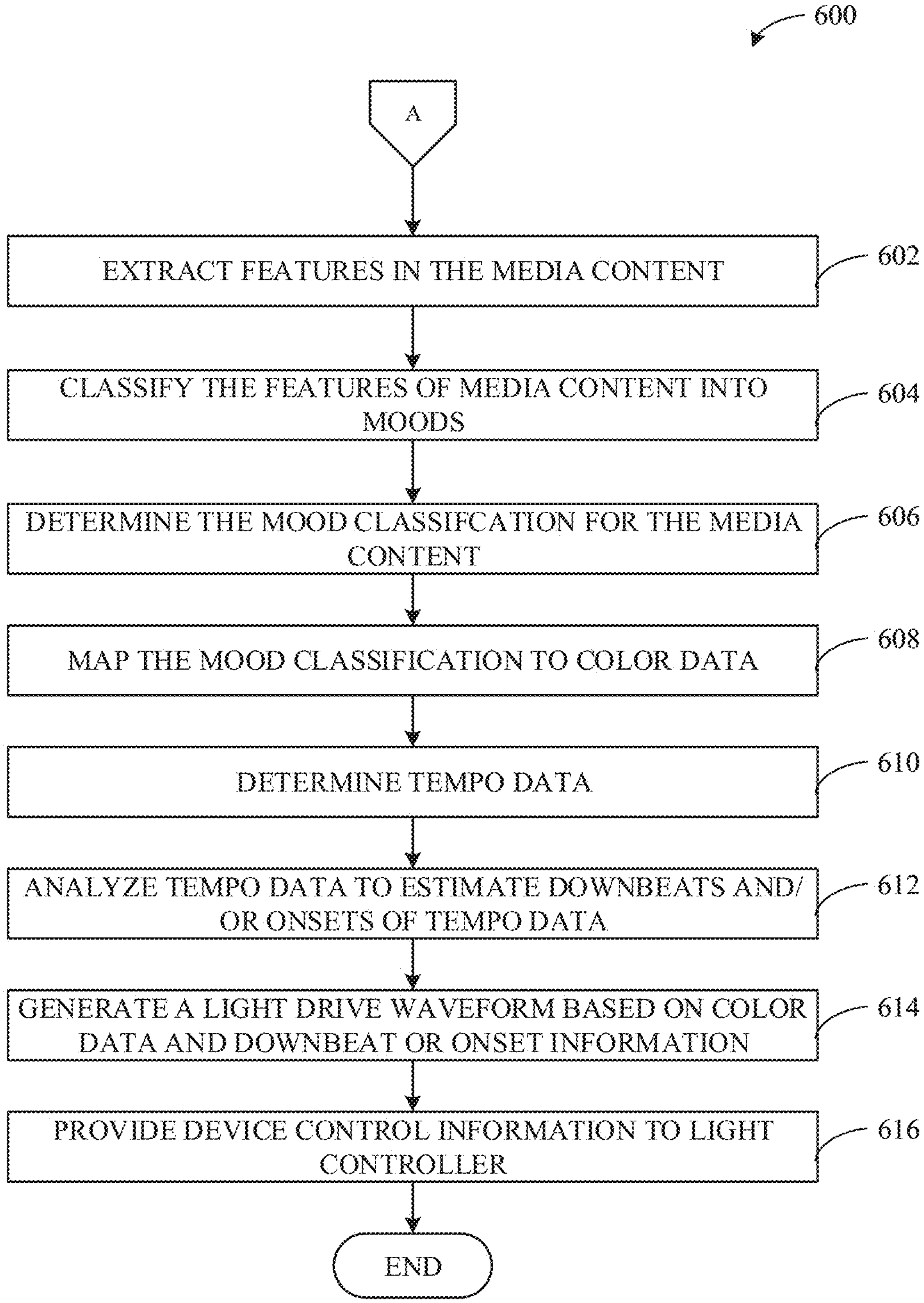
FIGS. 6-9 are flowcharts representative of machine readable instructions that may be executed to implement the example light control generator of FIGS. 1 and 2.

Turning to FIG. 6, the machine readable instructions 600 are implemented when the example content identification system 112 does not identify media (e.g., Block 508 of FIG. 5 returns a NO). The example machine readable instructions 600 begin when the example content identification system 112 sends a notification, such as instructions, via the network 104, to the mood identification system 222, indicative that media content was not identified. When the example mood identification system 222 receives instructions, the example mood identification system 222 initiates the example feature extractor 224.

The example feature extractor 224 (FIG. 2) extracts features in the media content (Block 602). For example, the feature extractor 224 processes samples of an audio signal (e.g., the monitored media content) to identify one or more features of the samples such as, for example, zero crossings, roll off power, brightness, flatness, roughness, minor third interval power, major third interval power, irregularity, chroma, main pitch, a key, etc. The example features are provided to the example classification engine 226 to classify the features of media content into one or more moods (Block 604).

For example, the classification engine 226 utilizes and/or generates mood models to output a mood classification (e.g., happy, sad, etc.) based on the features. Such an output may be probability values and/or likelihood values that the media content invokes a specific emotion in a listener. The example classification engine 226 determines the mood data for the media content (Block 606) based on the likelihood value. For example, the mood with the highest likelihood value can be the mood in which the audio signal is classified.

The example classification engine 226 provides the mood classification to the example mood analyzer 204. The example mood analyzer 204 maps the mood classification to color data (Block 608). For example, the mood analyzer 204 identifies the mood based on the received mood classification and notifies the color timeline generator 206. The example color timeline generator 206 retrieves a color map, associated with one or more moods, from the example metadata database 114. For example, RGB values are stored in the metadata database 114 and tagged with one or more mood labels. The example color timeline generator 206 may retrieve the RGB values associated with the mood label. The example color timeline generator 206 may further provide the RGB values to the example light drive waveform generator 210.

Further, the example beat tracking network 202 may determine the tempo data (Block 610) of the monitored media content. For example, the beat tracking network 202 may utilize an onset detector, a tempo analyzer, etc., to determine the tempo of the media content.

After the example beat tracking network 202 determines the tempo data of the monitored media content, the example beat tracking network 202 analyzes the tempo data to estimate downbeats and/or onsets of the tempo data (Block 612). For example, the beat tracking network 202 may generate an inter-onset interval graph to estimate the onsets of the tempo data. The example beat tracking network 202 may provide the downbeat estimation and/or inter-onset interval to the example light drive waveform generator 210.

The example light drive waveform generator 210 generates a light drive waveform based on the color data and the downbeat or onset information (Block 614). For example, the light drive waveform generator 210 generates device control information to control the light device 120 to be in synchronization with the media content. For example, the light drive waveform may include pulses at the same time of the onsets or downbeats of the tempo data. Additionally, the light drive waveform may include RGB values associated with the mood classification.

The example communication processor 220 provides the device control information (e.g., the light drive waveform) to the example light controller 118 (Block 616). For example, the device control information may be a package of data, an executable file, etc., that instructs the light controller 118 to perform an operation. In some examples, the communication processor 220 provides the device control information to the example light controller 118 in real time.

The example machine readable instructions 600 of FIG. 6 may end when the light drive waveform generator 210 stops generating DCI. The example machine readable instructions 600 may be repeated when the example content identification system 112 does not identify the media content.

Figure 7:
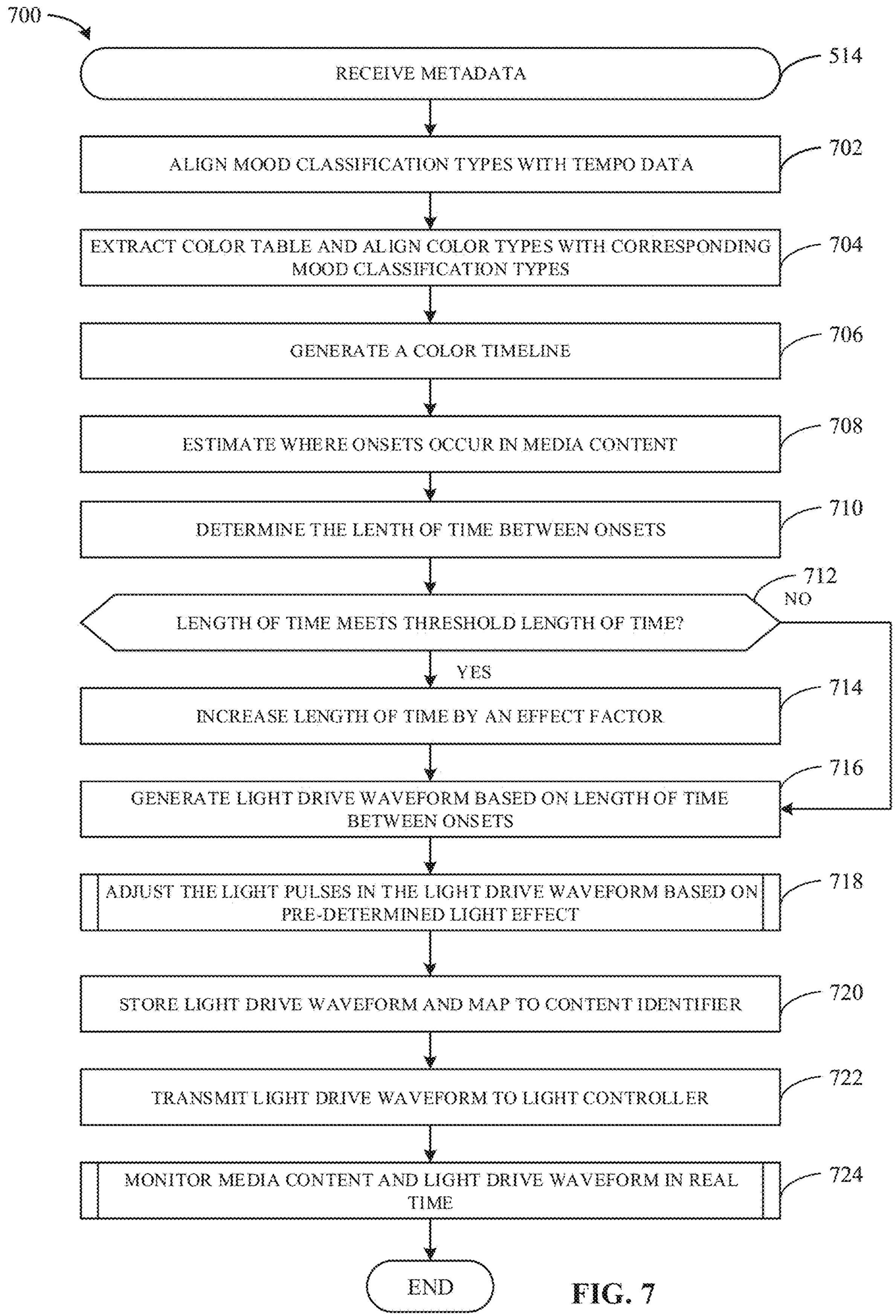

Turning to FIG. 7, example machine readable instructions 700 to generate device control information to synchronize the light device 120 with media content based on metadata are described. The example machine readable instructions 700 begin when the example light control generator 116 receives metadata (Block 514). For example, the tempo data and mood data are provided to the example light control generator 116.

The example mood analyzer 204 aligns the mood classification types with the tempo data (Block 702). For example, the mood analyzer 204 organizes mood classification types in order of time segments. Then, the example color timeline generator 206 extracts a color table and aligns color types with the corresponding mood classification types (Block 704). For example, the mood analyzer initiates the color timeline generator 206 to retrieve a color map from the example metadata database 114 by utilizing the content identifier.

Further, the example color timeline generator 206 aligns the color types with the mood classification types to generate a color timeline (Block 706). For example, the color timeline may be arrays of decimal values that correspond to composite colors and/or base colors, where the arrays are located in a point of time associated with a time of the audio signal and the mood label for that time in the audio signal.

The example beat tracking network 202 estimates where onsets occur in the media content (Block 708). For example, the beat tracking network 202 may utilize an onset detection circuit to capture abrupt changes in an audio signal at the beginning of transient region of notes. When the example beat tracking network 202 determines the onsets and/or pulses of the media content, the example beat tracking network 202 compares tempo data to the pulses of the media content. For example, the beat tracking network 202 aligns the pulses with the tempo data to determine the location of each significant beat in the audio signal.

The beat tracking network 202 determines the length of time between onsets (Block 710). For example, the beat tracking network 202 generates an inter-onset interval graph based on the location of the significant beats (e.g., onsets) in the audio signal. The inter-onset interval graph measures the distance, in time, between two onsets (e.g., beats).

The example light drive waveform generator 210 compares the length of time between onsets to a threshold length of time to determine if the onset length of time meets the threshold length of time (Block 712). For example, the if the onset length of time meets the threshold length of time (e.g., Block 712 returns a YES), the example light drive waveform generator 210 increases the length of time between pulses by an effect factor (Block 714). For example, the light drive waveform generator 210 increases the length of time between onsets in the inter-onset interval graph to reduce the number of onsets in the graph. Further, the example light drive waveform generator 210 generates a light drive waveform based on the increased length of time between onsets (Block 716). For example, the light drive waveform generator 210 pulses the light drive waveform at each time the onsets occur in the inter-onset interval graph.

Alternatively, if the onset length of time does not meet the threshold length of time (e.g., Block 712 returns a NO), the example light drive waveform generator 210 generates a light drive waveform based on the length of time between onsets (Block 716). For example, the light drive waveform generator 210 pulses the light drive waveform at each time in the audio signal the onset occurs.

The example effect engine 214 adjusts the light pulses in the light drive waveform based on a predetermined light effect 718. For example, the light drive waveform generator 210 provides the light drive waveform, after the light drive waveform has been generated, to the example effect engine 214. The example effect engine 214 may initiate an envelope with pre-determined attack and decay parameters. The example effect engine 214 may provide the light drive waveform to the input of the envelope to receive an adjusted light drive waveform. In some examples, the effect engine 214 provides the adjusted light drive waveform to the communication processor 220. The predetermined light effects are described in further detail below in connection with FIG. 8.

The example communication processor 220 may store the light drive waveform in the example light drive waveform database 212 and map the light drive waveform to the content identifier (Block 720). For example, the communication processor 220 receives the output of the effect engine 214 and determines to store the adjusted light drive waveform for subsequent use by the light control generator 116.

Additionally, the example communication processor 220 transmits the light drive waveform to the example light controller 118 (Block 722). For example, the communication processor 220 may compress the light drive waveform, utilizing any type of encoding technique, into an information packet, an executable file, etc., and send the information to the light controller 118.

Further, the example synchronizer 218 monitors the media content and light drive waveform in real time (Block 724). For example, the synchronizer 218 generates fingerprints periodically to determine the time the audio signal is playing back at the device 108. For example, the synchronizer 218 determines the fingerprint matches at 1 minute and 15 seconds into the audio signal. Further, the example synchronizer 218 analyzes the beat map to locate the beat strength at 1 minute and 15 seconds and adjusts the light drive waveform accordingly. For example, the synchronizer may adjust the pulsing time of the light drive waveform to match the beats in the beat map.

The example machine readable instructions 700 may end when the example synchronizer 218 and/or communication processor 220 determine there is no longer media content to monitor. The example machine readable instructions 700 may be repeated when the example device 108 begins playing back media content.

Figure 8:
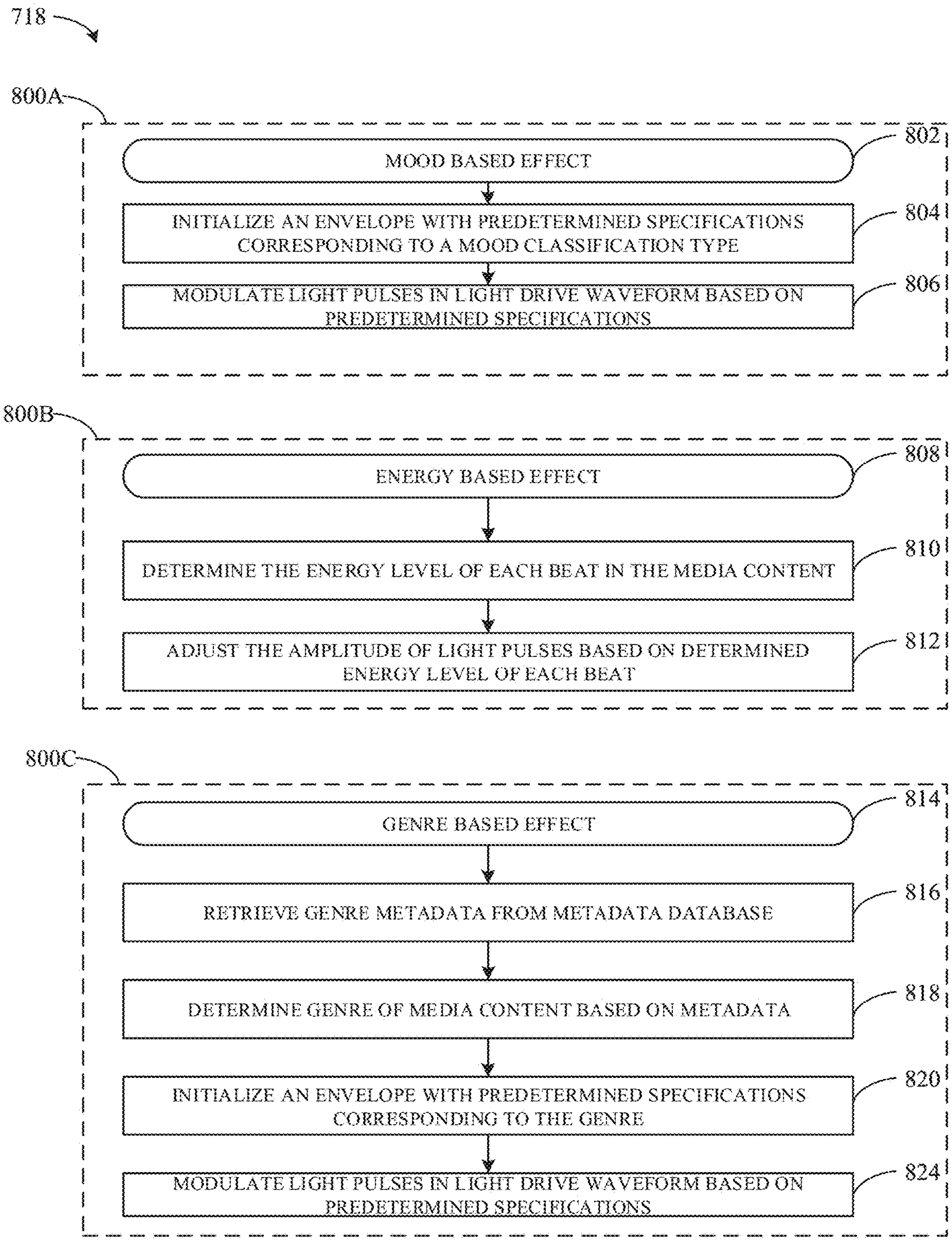

FIG. 8 illustrates machine readable instructions 800A, 800B, and 800C to be executed by the example effect engine 214 to implement effect types on the light drive waveform. In FIG. 8, the example machine readable instructions 800A are initiated when the example device 108 provides a notification to the example effect engine 214 with instructions to implement a mood based effect (Block 802).

In response to the mood based effect instructions (Block 802), the example effect engine 214 initializes an envelope with predetermined specifications corresponding to a mood classification type (Block 804). For example, the predetermined specifications may be an attack parameter and a decay parameter that are configured based on the mood classification type. The example effect engine 214 modulates the light pulses in the light drive waveform based on the predetermined specifications (Block 806). For example, the envelope is triggered based on an event. Such events may include a pulse in the light drive waveform. When the envelope is triggered by the pulse, the envelope may modulate the pulse based on the pre-defined attack parameters and decay parameters (Block 806). After the example effect engine 214 applies predetermined attack/decay parameters to each pulse in the light drive waveform, the example communication processor 220 provides the adjusted light drive waveform to the example light controller 118.

In FIG. 8, the example machine readable instructions 800B are initiated when the example device 108 provides a notification to the example effect engine 214 with instructions to implement an energy based effect (Block 808). The example effect engine 214 may query the example beat tracking network 202 to determine the energy level of each beat in the media content (Block 810). For example, the beat tracking network 202 may determine the beat strength for each beat in the audio signal (e.g., media content).

Further, the example effect engine 214 may initialize the example filter network 216 or an internal filter, to adjust the amplitude of the of the light pulses in the light drive waveform based on the energy level, beat strength, amplitude, etc. (Block 812). For example, the internal filters of the effect engine 214 or the filter network 216 is initialized in response to receiving the light pulse from the light drive waveform generator 210. The example effect engine 214 determines a how to adjust the amplitude of the pulse, based on the beat strength.

After the example effect engine 214 and/or filter network 216 adjusts the amplitude of light pulses in the light drive waveform (Block 812), the example communication processor 220 provides the adjusted light drive waveform to the example light controller 118.

In FIG. 8, the example machine readable instructions 800C are initiated when the example device 108 provides a notification to the example effect engine 214 with instructions to implement a genre based effect (Block 814).

Upon receipt of the genre based instructions, the example effect engine 214 retrieves genre metadata from the example metadata database 114 (Block 816). For example, the effect engine 214 utilizes the content identifier to retrieve genre data from the metadata database 114.

Further, the example effect engine 214 determines the genre of the media content based on the received metadata (Block 818). For example, the effect engine 214 may analyze the genre data to determine the genre effect. The example effect engine 214 utilizes the determined genre data to initialize an envelope with predetermined specifications corresponding to the genre (Block 820). For example, the memory 215 of the example effect engine 214 may include predetermined specifications tagged with a genre label. For example, predetermined attack time and decay time combinations may be associated with a genre label.

The envelope, after configuration, may be triggered in response to a pulse in the light drive waveform. The envelope may modulate light pulses in light drive waveform based on predetermined specifications (Block 824). For example, Rock or Electronica utilizes a fast attack parameter and Easy Listening utilizes a slow attack parameter.

When the example effect engine 214 completes modulation of light pulses (Block 824), the example effect engine 214, communication processor 220, and/or light control generator 116 provides the adjusted light drive waveform to the example light controller 118.

Figure 9:
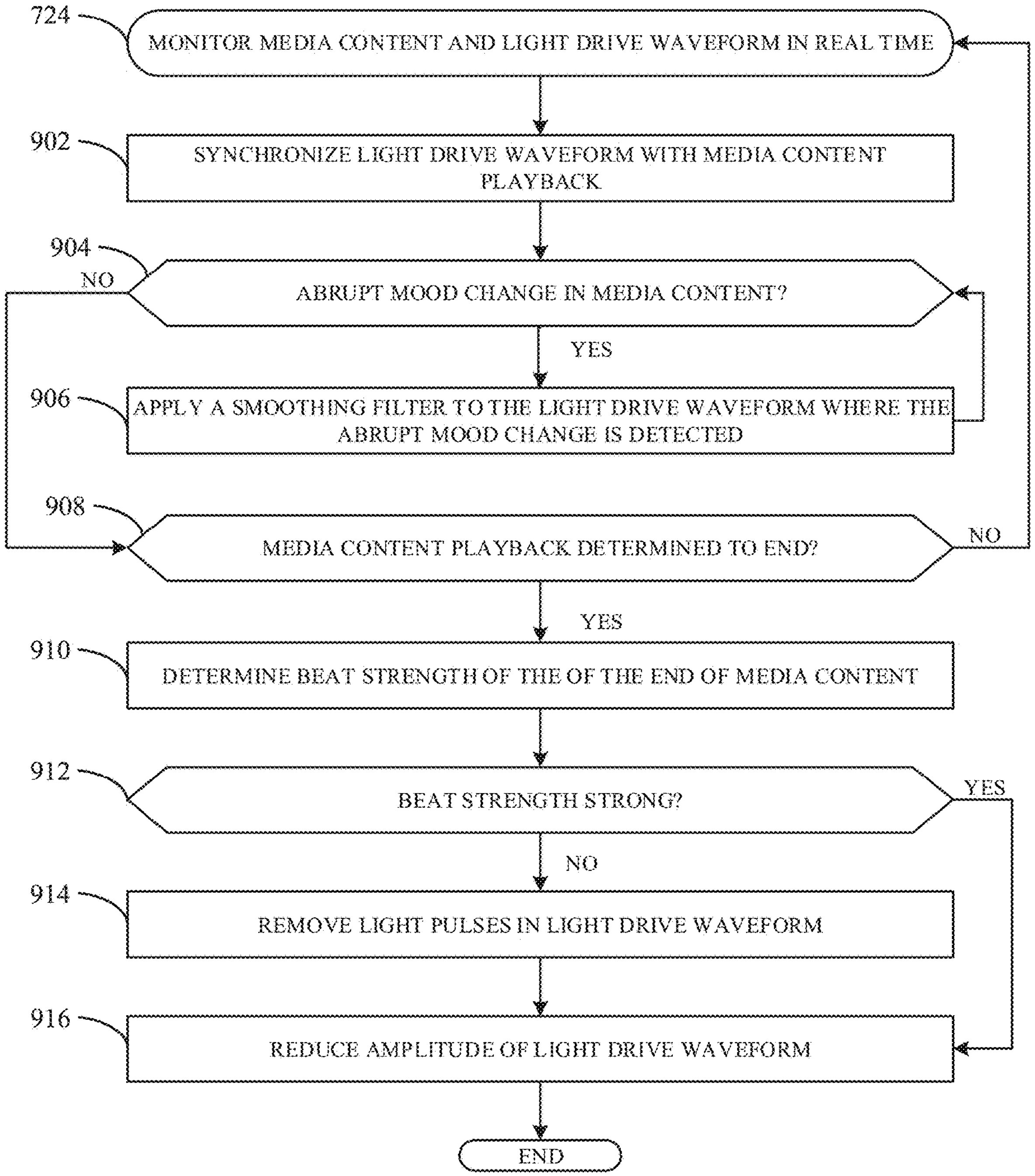

Turning to FIG. 9, example machine readable instructions to monitor media content and light drive waveforms in real time are described. The example machine readable instructions begin when the example synchronizer 218 synchronizes the light drive waveform with media content playback (Block 902). For example, the synchronizer 218 generates fingerprints every minute to determine if the pulsing time in the light drive waveform is in beat with the audio signal.

The example synchronizer 218 additionally monitors the moods throughout the media content playback. For example, the synchronizer 218 determines when an abrupt mood change occurs in the media content (Block 904). For example, an audio signal may include adjacent segments that have different mood classification types. Since mood classification types are correlated with color types, the adjacent audio segments may have two different colors types. If the example synchronizer 218 determines there is an abrupt mood change in the media content (e.g., Block 904 returns a YES), the example filter network 216 is initiated to apply a smoothing filter to the light drive waveform where the abrupt mood change is detected (Block 906).

For example, the filter network 216, upon receiving an instruction from the synchronizer 218, initiates an executable file. In this example, the approximating function is utilized. The approximating function implemented by the example filter network 216 gradually changes the color between adjacent color segments to reduce an abruptness of the color change between adjacent color segments. Alternatively, the executable files in the example filter network 216 may utilize any function, algorithm, program, application, etc., to smooth the data corresponding to the change from one color to a different color in the light drive waveform.

If the example synchronizer 218 does not determine an abrupt mood change in the media content (e.g., Block 904 returns a NO), or the control turns to block 908, where the example synchronizer 218 and/or communication processor 220 determines if the media content play back is going to end. For example, the synchronizer 218 can analyze the location of the audio signal, via a fingerprint, to determine if the audio signal is near the end of the audio signal duration.

If the example synchronizer 218 and/or communication processor 220 determines the media content playback is not going to end (e.g., Block 808 returns a NO), control returns to block 724, where the example synchronizer 218 monitors media content and the light drive waveform in real time.

If the example synchronizer 218 and/or communication processor 220 determines the media content is going to end (e.g., Block 908 returns a YES), the example effect engine 214 determines the beat strength of the end of the media content. For example, the effect engine 214 can determine the beat strength based on the inter-onset interval graph stored in the inter-onset interval database 208. In some examples, the beat strength of the media content corresponds to the number of beats left in the media content, the amplitude level of the beats in the media content, etc.

The example effect engine 214 determines if the beat strength at the end of the media content is strong (Block 912). For example, if the effect engine 214 determines the energy level of beats in the end of a song is low (e.g., Block 912 returns a NO), the example effect engine 214 removes light pulses in the light drive waveform (Block 914). For example, the effect engine 214 operates to remove any unnecessary and/or over engaging light effects before transitioning to new media content or even transitioning off.

Further, the example effect engine 214 reduces the amplitude of the light drive waveform (Block 916). For example, the effect engine 214 prepares to turn off the light device 120 by dimming the light device 120.

If the example effect engine 214 determines the beat strength of the media content is strong (e.g., Block 912 returns a YES), control turns to block 916 where the example effect engine 214 reduces the amplitude of the light drive waveform. In some examples, when the beat strength of the media content is strong, there are light pulses in the light drive waveform with corresponding amplitudes. Therefore, the light drive waveform generator 210 reduces the amplitude of the light pulses at the end of the media content to smooth the transition between media content and indicate to the user that the media content is terminating.

The example machine readable instructions of FIG. 9 end when the example effect engine 214, communication processor 220, and/or light control generator 116 stop providing DCI to the example light controller 118. The example machine readable instructions of FIG. 9 may be repeated when the example synchronizer 218 receives an instruction to monitor media content playback.

Figure 10:
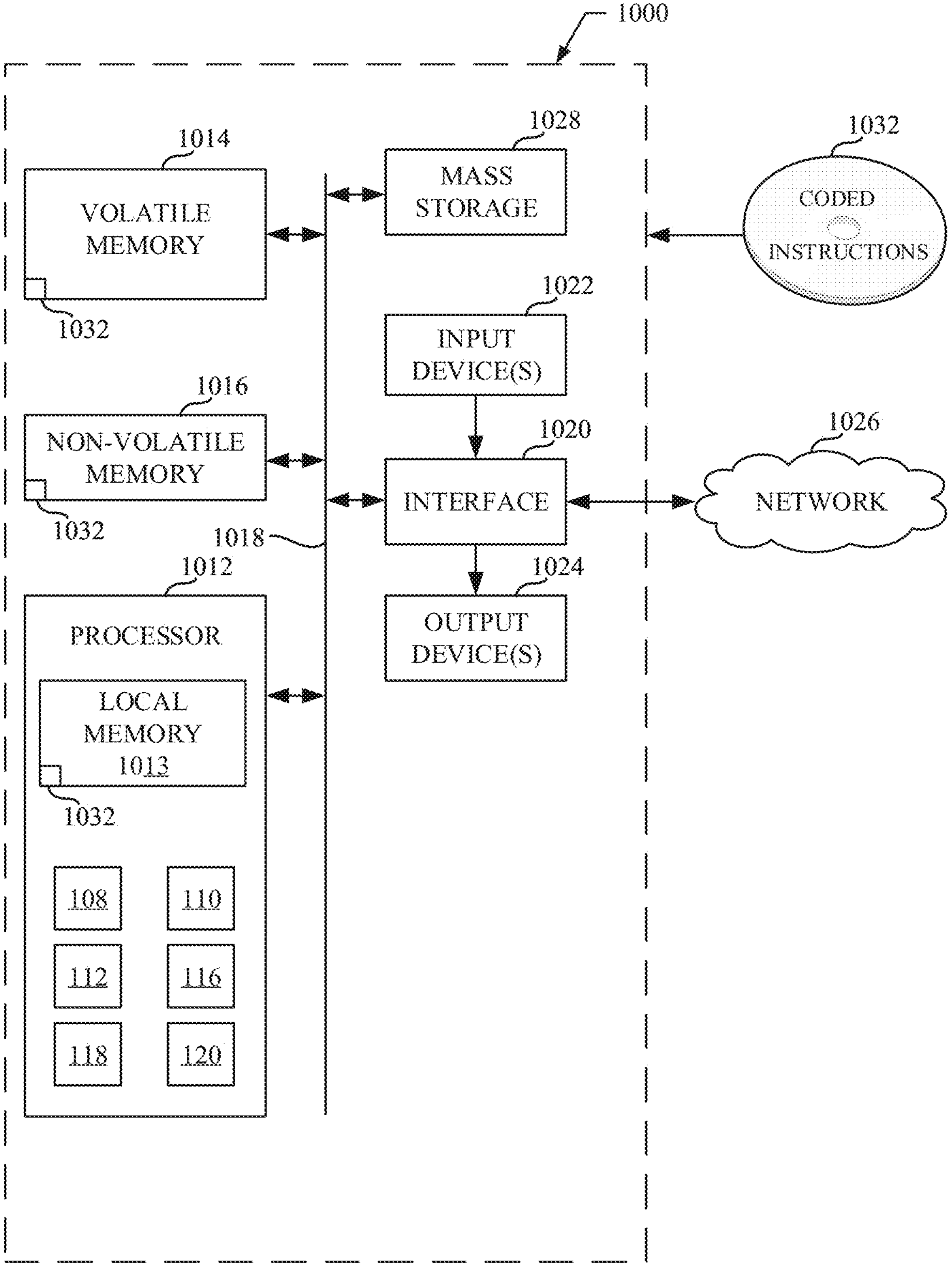
FIG. 10 is a block diagram of an example processing platform structured to execute the instructions of FIGS. 5-9 to implement the network diagram of FIG. 1.

FIG. 10 is a block diagram of an example processor platform 1000 structured to execute the instructions of FIGS. 5-9 to implement the network diagram 100 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example device 108, the example content identifier generator 110, the example content identification system 112, the example light control generator 116, the example light controller 118, and the example light device 120.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 5-9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that control a light device based on played back media content to engage a user. The disclosed methods, apparatus and articles of manufacture improve the efficiency of using a computing device by minimizing the processing power used to perform the generation of light control parameters (e.g., device control information) by utilizing pre-computed data, stored in a database, to recall each time media content is identified and played back at a media device, thus. The disclosed methods, apparatus and articles of manufacture are accordingly directed to one or more improvement(s) in the functioning of a computer.

Example methods, apparatus, systems, and articles of manufacture to control lighting effects are disclosed herein. Further examples and combinations thereof include the following: Example 1 includes an apparatus to adjust device control information, the apparatus comprising a light drive waveform generator to obtain metadata corresponding to media and generate device control information based on the metadata, the device control information to inform a lighting device to enable consecutive light pulses, an effect engine to apply an attack parameter and a decay parameter to consecutive light pulses corresponding to the device control information, the attack parameter and the decay parameter based on the metadata to affect a shape of the consecutive light pulses, and a color timeline generator to generate color information based on the metadata, the color information to inform the lighting device to change a color state.

Example 2 includes the apparatus of example 1, further including a filter network to apply a smoothing filter to the color information when the color information is indicative of a change from a first color state to a second color state.

Example 3 includes the apparatus of example 2, wherein the smoothing filter is to reduce an abruptness of the change from the first color state to the second color state.

Example 4 includes the apparatus of example 1, wherein the supplemental metadata includes mood information, tempo information, genre information, and energy level information corresponding to media.

Example 5 includes the apparatus of example 1, where the effect engine is to initialize an envelope with predetermined specifications corresponding to mood information, the predetermined specifications including the attack parameter and the decay parameter that are configured based on the mood information.

Example 6 includes the apparatus of example 1, wherein the effect engine is to initialize an envelope with predetermined specifications corresponding to genre information, the predetermined specifications including the attack parameter and the decay parameter that are configured based on the genre information.

Example 7 includes the apparatus of example 1, wherein the effect engine is to initialize an envelope to modulate the consecutive light pulses.

Example 8 includes the apparatus of example 1, wherein the effect engine is to initialize a filter to adjust an amplitude of the consecutive light pulses based on an energy of the media.

Example 9 includes a non-transitory computer readable storage medium comprising computer readable instructions that, when executed, cause at least one processor to at least obtain supplemental metadata corresponding to media and generate device control information based on the supplemental metadata, the device control information to inform a lighting device to enable consecutive light pulses, apply an attack parameter and a decay parameter to consecutive light pulses corresponding to the device control information, the attack parameter and the decay parameter based on the supplemental metadata to affect a shape of the consecutive light pulses, and generate color information based on the supplemental metadata, the color information to inform the lighting device to change a color state.

Example 10 includes the non-transitory computer readable storage medium of example 9, wherein the computer readable instructions, when executed, cause the at least one processor to apply a smoothing filter to the color information when the color information is indicative of a change from a first color state to a second color state.

Example 11 includes the non-transitory computer readable storage medium of example 10, wherein the computer readable instructions, when executed, cause the at least one processor to reduce an abruptness of the change from the first color state to the second color state.

Example 12 includes the non-transitory computer readable storage medium of example 9, wherein the computer readable instructions, when executed, cause the at least one processor to initialize an envelope with predetermined specifications corresponding to mood information, the predetermined specifications including the attack parameter and the decay parameter that are configured based on the mood information.

Example 13 includes the non-transitory computer readable storage medium of example 9, wherein the computer readable instructions, when executed, cause the at least one processor to initialize an envelope with predetermined specifications corresponding to genre information, the predetermined specifications including the attack parameter and the decay parameter that are configured based on the genre information.

Example 14 includes the non-transitory computer readable storage medium of example 13, wherein the computer readable instructions, when executed, cause the at least one processor to initialize an envelope to modulate the consecutive light pulses.

Example 15 includes the non-transitory computer readable storage medium of example 9, wherein the computer readable instructions, when executed, cause the at least one processor to initialize a filter to adjust an amplitude of the consecutive light pulses based on an energy of the media.

Example 16 includes a method comprising obtaining metadata corresponding to media and generating device control information based on the metadata, the device control information to inform a lighting device to enable consecutive light pulses, applying an attack parameter and a decay parameter to consecutive light pulses corresponding to the device control information, the attack parameter and the decay parameter based on the metadata to affect a shape of the consecutive light pulses, and generating color information based on the metadata, the color information to inform the lighting device to change a color state.

Example 17 includes the method of example 16, further including applying a smoothing filter to the color information when the color information is indicative of a change from a first color state to a second color state.

Example 18 includes the method of example 17, wherein the smoothing filter is to reduce an abruptness of the change from the first color state to the second color state.

Example 19 includes the method of example 16, further including initializing an envelope with predetermined specifications corresponding to mood information, the predetermined specifications including the attack parameter and the decay parameter that are configured based on the mood information.

Example 20 includes the method of example 16, further including initializing a filter to adjust an amplitude of the consecutive light pulses based on an energy of the media.

Example 21 includes an apparatus to generate light control information, the apparatus comprising a beat tracking network to determine an estimated length of time between a first media onset and a second media onset in media, a light drive waveform generator to obtain the estimated length of time, compare the estimated length of time to a time threshold, the time threshold corresponding to a desired time between consecutive light pulses, the consecutive light pulses to be enabled by a light controller, when the time threshold is not satisfied, increase the estimated length of time, the increased estimated length of time to be analyzed to generate light pulse spacing, and generate light control information based on the light pulse spacing, the light control information to inform the light controller to enable the consecutive light pulses, and an effect engine to generate intensity information based on a first amplitude of the first media onset and a second amplitude of the second media onset, the intensity information corresponding to an amplitude of the consecutive light pulses.

Example 22 includes the apparatus of example 21, wherein the light drive waveform generator is to increase the estimated length of time by an effect factor, the effect factor corresponding to a) mood data of the media, b) genre of the media, or c) energy of the media.

Example 23 includes the apparatus of example 21, further including a color timeline generator is to obtain a color table to generate color control information indicative of one or more colors of that a lighting device is to emit.

Example 24 includes the apparatus of example 21, wherein the beat tracking network is to determine timestamps for the first and second media onsets in the media, the timestamps indicative of a time the first and second media onsets occur in the media.

Example 25 includes the apparatus of example 24, wherein the light drive waveform generator is to determine the estimated length of time between the first and second media onsets in the media based on the timestamps for the first and second media onsets.

Example 26 includes the apparatus of example 21, further including a synchronizer to determine a termination timestamp in the media indicative of a termination of the media, and determine a beat strength of the media at a duration of time before the termination timestamp, the beat strength indicative of an energy of the media at the duration of time before the termination timestamp.

Example 27 includes the apparatus of example 26, wherein the synchronizer is to generate light control information that disables consecutive light pulses at the duration of time before the termination timestamp when the energy of the media satisfies an energy threshold, the energy threshold corresponding to lower energy level of the media relative to an average energy level of the media.

Example 28 includes a non-transitory computer readable storage medium comprising computer readable instructions that, when executed, cause at least one processor to at least determine an estimated length of time between a first media onset and a second media onset in media, obtain the estimated length of time, compare the estimated length of time to a time threshold, the time threshold corresponding to a desired time between consecutive light pulses, the consecutive light pulses to be enabled by a light controller, when the time threshold is not satisfied, increase the estimated length of time, the increased estimated length of time to be analyzed to generate light pulse spacing, generate light control information based on the light pulse spacing, the light control information to inform the light controller to enable the consecutive light pulses, and generate intensity information based on a first amplitude of the first media onset and a second amplitude of the second media onset, the intensity information corresponding to an amplitude of the consecutive light pulses.

Example 29 includes the non-transitory computer readable storage medium of example 28, wherein the computer readable instructions, when executed, cause the at least one processor to increase the estimated length of time by an effect factor, the effect factor corresponding to a) mood data of the media, b) genre of the media, or c) energy of the media.

Example 30 includes the non-transitory computer readable storage medium of example 28, wherein the computer readable instructions, when executed, cause the at least one processor to obtain a color table to generate color control information indicative of one or more colors of that a lighting device is to emit.

Example 31 includes the non-transitory computer readable storage medium of example 28, wherein the computer readable instructions, when executed, cause the at least one processor to determine timestamps for the first and second media onsets in the media, the timestamps indicative of a time the first and second media onsets occur in the media.

Example 32 includes the non-transitory computer readable storage medium of example 31, wherein the computer readable instructions, when executed, cause the at least one processor to determine the estimated length of time between the first and second media onsets in the media based on the timestamps for the first and second media onsets.

Example 33 includes the non-transitory computer readable storage medium of example 28, wherein the computer readable instructions, when executed, cause the at least one processor to determine a termination timestamp in the media indicative of a termination of the media, and determine a beat strength of the media at a duration of time before the termination timestamp, the beat strength indicative of an energy of the media at the duration of time before the termination timestamp.

Example 34 includes the non-transitory computer readable storage medium of example 33, wherein the computer readable instructions, when executed, cause the at least one processor to generate light control information that disables consecutive light pulses at the duration of time before the termination timestamp when the energy of the media satisfies an energy threshold, the energy threshold corresponding to lower energy level of the media relative to an average energy level of the media.

Example 35 includes a method to generate a light drive waveform, the method comprising determining an estimated length of time between a first media onset and a second media onset in media, obtaining the estimated length of time, comparing the estimated length of time to a time threshold, the time threshold corresponding to a desired time between consecutive light pulses, the consecutive light pulses to be enabled by a light controller, when the time threshold is not satisfied, increasing the estimated length of time, the increased estimated length of time to be analyzed to generate light pulse spacing, generating light control information based on the light pulse spacing, the light control information to inform the light controller to enable the consecutive light pulses, and generating intensity information based on a first amplitude of the first media onset and a second amplitude of the second media onset, the intensity information corresponding to an amplitude of the consecutive light pulses.

Example 36 includes the method of example 35, further including increasing the estimated length of time by an effect factor, the effect factor corresponding to a) mood data of the media, b) genre of the media, or c) energy of the media.

Example 37 includes the method of example 35, further including determining timestamps for the first and second media onsets in the media, the timestamps indicative of a time the first and second media onsets occur in the media.

Example 38 includes the method of example 37, wherein determining the estimated length of time between the first and second media onsets in the media based on the timestamps for the first and second media onsets.

Example 39 includes the method of example 35, further including determining a termination timestamp in the media indicative of a termination of the media, and determining a beat strength of the media at a duration of time before the termination timestamp, the beat strength indicative of an energy of the media at the duration of time before the termination timestamp.

Example 40 includes the method of example 39, further including generating light control information that disables consecutive light pulses at the duration of time before the termination timestamp when the energy of the media satisfies an energy threshold, the energy threshold corresponding to lower energy level of the media relative to an average energy level of the media.

Example 41 includes a method to generate a breathing effect, the method comprising identifying a media content and supplemental metadata corresponding to the media content, the supplemental metadata including tempo data and mood data, extracting a tempo value from the tempo data, the tempo value corresponding to beats per minute of the media content, generating light pulses based on the tempo value, the light pulses to pulse at an equal rate as the beats per minute, and generating color instructions to change a color of the light pulses based on the mood data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

The invention claimed is:

1. A method comprising:

identifying a media content and metadata corresponding to the media content, the metadata comprising tempo data;

determining a tempo value from the tempo data, the tempo value corresponding to beats per minute of the media content; and generating light pulses based on the tempo value, wherein the light pulses pulse at an equal rate as the beats per minute, and wherein the light pulses generate a breathing effect.

2. The method of claim 1, further comprising:

generating color control information to change a color of light pulses based on the tempo value.

3. The method of claim 2, wherein the metadata comprises mood data, and wherein generating the color control information to change the color of the light pulses is based on the mood data.

4. The method of claim 3, further comprising:

obtaining a color table mapped to the mood data to generate the color control information, the color table having colors mapped to one or more mood classifications.

5. The method of claim 4, further comprising generating a timeline of decimal codes based on the color table, the decimal codes indicative of a color and associated with a time in the media content.

6. The method of claim 1, wherein identifying the media content includes:

generating a first fingerprint of an audio signal associated with the media content;

causing a comparison of the first fingerprint to a second fingerprint indicative of pre-identified media content based on sending the first fingerprint to a content identification system; and in response to the first fingerprint matching the second fingerprint, receiving a content identifier that identifies the media content, the content identifier mapped to supplemental metadata.

7. The method of claim 1, further comprising:

receiving a notification indicative that an intensity of the light pulses exceeds a first amplitude, the first amplitude corresponding to a first luminance of the light pulses; and adjusting the intensity of the light pulses to a second amplitude less than the first amplitude to reduce the first luminance.

8. The method of claim 1, further comprising applying an attack time and a decay time to the light pulses, the attack time exceeding the decay time to generate the breathing effect.

9. The method of claim 1, further comprising;

determining whether a shape of the light pulses corresponds to a sine wave; and in response to determining that the shape of the light pulses corresponds to the sine wave, applying a Schmitt trigger to the light pulses to output a triangle wave, the triangle wave associated with the breathing effect.

10. A computing system comprising:

a processor; and a non-transitory computer-readable storage medium, having stored thereon program instructions that, upon execution by the processor, cause performance of a set of operations comprising:

identifying a media content and metadata corresponding to the media content, the metadata comprising tempo data;

determining a tempo value from the tempo data, the tempo value corresponding to beats per minute of the media content; and generating light pulses based on the tempo value, wherein the light pulses pulse at an equal rate as the beats per minute, and wherein the light pulses generate a breathing effect.

11. The computing system of claim 10, wherein the set of operations further comprises:

generating color control information to change a color of light pulses based on the tempo value.

12. The computing system of claim 11, wherein the metadata comprises mood data, and wherein generating the color control information to change the color of the light pulses is based on the mood data.

13. The computing system of claim 12, wherein the set of operations further comprises:

obtaining a color table mapped to the mood data to generate the color control information, the color table having colors mapped to one or more mood classifications.

14. The computing system of claim 13, wherein the set of operations further comprises:

generating a timeline of decimal codes based on the color table, the decimal codes indicative of a color and associated with a time in the media content.

15. The computing system of claim 10, wherein the set of operations further comprises:

generating a first fingerprint of an audio signal associated with the media content;

comparing the first fingerprint to a second fingerprint indicative of pre-identified media content based on sending the first fingerprint to a content identification system; and in response to the first fingerprint matching the second fingerprint, receiving a content identifier that identifies the media content, the content identifier mapped to the metadata.

16. The computing system of claim 10, wherein the set of operations further comprises:

receiving a notification indicative that an intensity of the light pulses exceeds a first amplitude, the first amplitude corresponding to a first luminance of the light pulses; and adjusting the intensity of the light pulses to a second amplitude less than the first amplitude to reduce the first luminance.

17. The computing system of claim 10, wherein the set of operations further comprises:

applying an attack time and a decay time to the light pulses, the attack time exceeding the decay time to generate the breathing effect of the light pulses.

18. The computing system of claim 10, wherein the set of operations further comprises:

determining whether a shape of the light pulses corresponds to a sine wave; and in response to determining that the shape of the light pulses corresponds to the sine wave, applying a Schmitt trigger to the light pulses to output a triangle wave, the triangle wave associated with the breathing effect of the light pulses.

19. A non-transitory computer-readable storage medium, having stored thereon program instructions that, upon execution by a processor, cause performance of a set of operations comprising:

identifying a media content and metadata corresponding to the media content, the metadata comprising tempo data;

determining a tempo value from the tempo data, the tempo value corresponding to beats per minute of the media content; and generating light pulses based on the tempo value, wherein the light pulses pulse at an equal rate as the beats per minute, and wherein the light pulses generate a breathing effect.

20. The non-transitory computer-readable storage medium of claim 19, wherein the set of operations further comprises:

generating color control information to change a color of light pulses based on the tempo value.

* * * * *